(12) United States Patent
Shenoy et al.

(10) Patent No.: US 10,300,415 B2
(45) Date of Patent: May 28, 2019

(54) FINE FIBERS MADE FROM REACTIVE ADDITIVES

(71) Applicant: Donaldson Company, Inc., Bloomington, MN (US)

(72) Inventors: Suresh Laxman Shenoy, Bloomington, MN (US); Dustin Allen Zastera, Hastings, MN (US); Thomas Moore Weik, Deephaven, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 92 days.

(21) Appl. No.: 14/198,017

(22) Filed: Mar. 5, 2014

(65) Prior Publication Data

US 2014/0256873 A1    Sep. 11, 2014

Related U.S. Application Data

(60) Provisional application No. 61/775,535, filed on Mar. 9, 2013.

(51) Int. Cl.
*C08G 69/50* (2006.01)
*B01D 39/16* (2006.01)
*D01F 1/10* (2006.01)
*D01D 5/00* (2006.01)

(52) U.S. Cl.
CPC ......... *B01D 39/1623* (2013.01); *C08G 69/50* (2013.01); *D01F 1/10* (2013.01); *D01D 5/0015* (2013.01)

(58) Field of Classification Search
CPC .................................................. C08G 69/50
See application file for complete search history.

(56) References Cited

U.S. PATENT DOCUMENTS

| | | | |
|---|---|---|---|
| 2,169,250 A | 8/1939 | Izard | |
| 2,265,742 A | 12/1941 | Norton, Jr. et al. | |
| 2,338,570 A | 1/1944 | Childs | |
| 2,384,947 A | 9/1945 | Matheson | |
| 2,443,450 A | 6/1948 | Boynton et al. | |
| 2,484,523 A | 10/1949 | McClellan et al. | |
| 3,284,178 A | 11/1966 | Timmer et al. | |
| 3,824,178 A | 7/1974 | Wald | |
| 3,980,605 A | 9/1976 | Steigelmann et al. | |
| 3,998,690 A | 12/1976 | Lyness et al. | |
| 4,088,620 A | 5/1978 | Nihongi et al. | |
| 4,113,912 A | 9/1978 | Okita | |

(Continued)

FOREIGN PATENT DOCUMENTS

CA    2117210 A1    9/1994
CA    2223731 A1    12/1996
(Continued)

OTHER PUBLICATIONS

U.S. Appl. No. 61/620,251, filed Apr. 4, 2012, Shenoy.
(Continued)

*Primary Examiner* — Michael F Pepitone
(74) *Attorney, Agent, or Firm* — Mueting, Raasch & Gebhardt, P.A.

(57) ABSTRACT

The present disclosure provides a unique fine fiber material that is formed from a fiber-forming polymer material with at least two reactive additives that are capable of reacting with each other, and optionally reacting with the fiber-forming polymer.

21 Claims, 11 Drawing Sheets

(56) References Cited

U.S. PATENT DOCUMENTS

Figure 1:
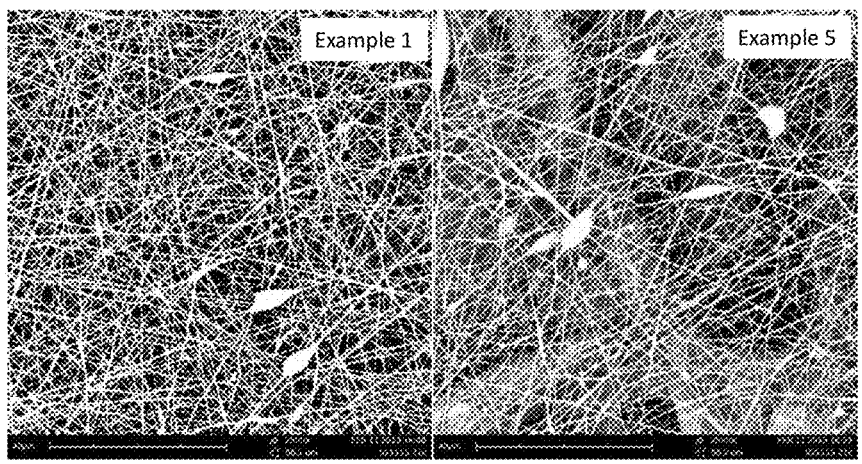

| | | |
|---|---|---|
| 4,399,091 A | 8/1983 | Eisenstein et al. |
| 4,469,606 A | 9/1984 | Reid et al. |
| 4,603,083 A | 7/1986 | Tanaka et al. |
| 4,650,506 A | 3/1987 | Barris et al. |
| 4,698,194 A | 10/1987 | Tanaka et al. |
| 4,992,515 A | 2/1991 | Ballard |
| 5,143,954 A | 9/1992 | Hutton et al. |
| 5,166,246 A | 11/1992 | Gallucci et al. |
| 5,314,513 A | 5/1994 | Miller et al. |
| 5,340,522 A | 8/1994 | Taniguchi et al. |
| 5,364,456 A | 11/1994 | Kahlbaugh et al. |
| 5,604,007 A * | 2/1997 | Shore ............ C08L 77/00 428/92 |
| 5,672,399 A | 9/1997 | Kahlbaugh et al. |
| 5,766,158 A | 6/1998 | Opolski |
| 5,779,960 A | 7/1998 | Berlowitz et al. |
| 5,855,832 A | 1/1999 | Clausi |
| 5,908,477 A | 6/1999 | Harmer et al. |
| 5,914,299 A | 6/1999 | Harmer et al. |
| 5,919,716 A | 7/1999 | Raynolds et al. |
| 6,117,226 A | 9/2000 | Dial et al. |
| 6,165,572 A | 12/2000 | Kahlbaugh et al. |
| 6,174,601 B1 | 1/2001 | Stanitis et al. |
| 6,221,152 B1 | 4/2001 | Dial et al. |
| 6,268,440 B1 | 7/2001 | Kudo et al. |
| 6,339,116 B1 | 1/2002 | Afzali et al. |
| 6,368,386 B1 | 4/2002 | Nelson et al. |
| 6,368,544 B1 | 4/2002 | Owens |
| 6,419,787 B2 | 7/2002 | Goulet et al. |
| 6,537,670 B1 | 3/2003 | Sassi |
| 6,641,773 B2 | 11/2003 | Kleinmeyer et al. |
| 6,673,136 B2 | 1/2004 | Gillingham et al. |
| 6,686,051 B1 | 2/2004 | Weinert et al. |
| 6,716,274 B2 | 4/2004 | Gogins et al. |
| 6,730,723 B2 | 5/2004 | Frick et al. |
| 6,740,142 B2 | 5/2004 | Buettner et al. |
| 6,743,273 B2 | 6/2004 | Chung et al. |
| 6,746,517 B2 | 6/2004 | Benson et al. |
| 6,794,032 B2 | 9/2004 | Borgner et al. |
| 6,800,117 B2 | 10/2004 | Barris et al. |
| 6,811,653 B2 | 11/2004 | Huang |
| 6,841,023 B2 | 1/2005 | Mott |
| 6,855,743 B1 | 2/2005 | Gvozdic |
| 6,867,250 B1 | 3/2005 | Gupta et al. |
| 6,875,256 B2 | 4/2005 | Gillingham et al. |
| 6,924,028 B2 | 8/2005 | Chung et al. |
| 6,955,775 B2 | 10/2005 | Chung et al. |
| 6,974,490 B2 | 12/2005 | Gillingham et al. |
| 6,994,742 B2 | 2/2006 | Barris et al. |
| 7,008,465 B2 | 3/2006 | Graham et al. |
| 7,070,640 B2 | 7/2006 | Chung et al. |
| 7,090,715 B2 | 8/2006 | Chung et al. |
| 7,115,150 B2 | 10/2006 | Johnson et al. |
| 7,179,317 B2 | 2/2007 | Chung et al. |
| 7,270,692 B2 | 9/2007 | Gillingham et al. |
| 7,270,693 B2 | 9/2007 | Chung et al. |
| 7,316,723 B2 | 1/2008 | Chung et al. |
| 7,318,852 B2 | 1/2008 | Chung et al. |
| 7,318,853 B2 | 1/2008 | Chung et al. |
| 7,615,567 B2 | 11/2009 | Carroll |
| 7,641,055 B2 | 1/2010 | Ferrer et al. |
| 7,799,169 B2 | 9/2010 | Bhat et al. |
| 7,807,743 B2 | 10/2010 | Green et al. |
| 7,927,540 B2 | 4/2011 | Smithies et al. |
| 7,943,566 B2 | 5/2011 | Uitenbroek et al. |
| 7,947,644 B2 | 5/2011 | Uitenbroek et al. |
| 7,988,860 B2 | 8/2011 | Kalayci et al. |
| 8,029,588 B2 | 10/2011 | Chung et al. |
| 8,084,523 B2 | 12/2011 | Lopez et al. |
| 8,118,901 B2 | 2/2012 | Chung et al. |
| 8,309,225 B2 | 11/2012 | Rodgers |
| 8,349,764 B2 | 1/2013 | Burba, III |
| 8,366,797 B2 | 2/2013 | Chung et al. |
| 8,403,151 B2 | 3/2013 | Cheng et al. |
| 8,512,431 B2 | 8/2013 | Chung et al. |
| 2001/0042605 A1 | 11/2001 | Goulet et al. |
| 2001/0049421 A1 | 12/2001 | Burlone |
| 2002/0059868 A1 | 5/2002 | Gogins et al. |
| 2002/0073667 A1 | 6/2002 | Barris et al. |
| 2002/0073849 A1 | 6/2002 | Buettner et al. |
| 2002/0096255 A1 | 7/2002 | Mott |
| 2002/0176986 A1 | 11/2002 | Watanabe et al. |
| 2002/0198355 A1 | 12/2002 | Wonner et al. |
| 2003/0037675 A1 | 2/2003 | Gillingham et al. |
| 2003/0073799 A1 | 4/2003 | Frick et al. |
| 2003/0079846 A1 | 5/2003 | Huang |
| 2003/0092814 A1 | 5/2003 | Borgner et al. |
| 2003/0106294 A1 | 6/2003 | Chung et al. |
| 2003/0224936 A1 | 12/2003 | Kretzschmar |
| 2004/0060268 A1 | 4/2004 | Chung et al. |
| 2004/0060269 A1 | 4/2004 | Chung et al. |
| 2004/0060677 A1 | 4/2004 | Huang |
| 2004/0087706 A1 | 5/2004 | Fish et al. |
| 2004/0096656 A1 | 5/2004 | Bond |
| 2004/0123572 A1 | 7/2004 | Chung et al. |
| 2004/0134353 A1 | 7/2004 | Gillingham et al. |
| 2004/0142107 A1 | 7/2004 | Eriksson et al. |
| 2004/0166751 A1 | 8/2004 | Peng et al. |
| 2004/0187454 A1 | 9/2004 | Chung et al. |
| 2004/0197468 A1 | 10/2004 | Geel et al. |
| 2004/0200354 A1 | 10/2004 | Barris et al. |
| 2004/0203306 A1 | 10/2004 | Grafe et al. |
| 2004/0223040 A1 | 11/2004 | Graham et al. |
| 2005/0070186 A1 | 3/2005 | Shoemake et al. |
| 2005/0229814 A1 | 10/2005 | Muvundamina |
| 2005/0235619 A1 | 10/2005 | Heinz et al. |
| 2005/0287383 A1 | 12/2005 | Taylor et al. |
| 2006/0042767 A1 | 3/2006 | Bhat et al. |
| 2006/0098342 A1 | 5/2006 | Matsumoto et al. |
| 2006/0117730 A1 | 6/2006 | Chung et al. |
| 2006/0187491 A1 | 8/2006 | Sakai |
| 2006/0196359 A1 | 9/2006 | Gillingham et al. |
| 2006/0216536 A1 | 9/2006 | Liu et al. |
| 2006/0231487 A1 | 10/2006 | Bartley et al. |
| 2006/0234027 A1 | 10/2006 | Huusken |
| 2007/0012007 A1 | 1/2007 | Chung et al. |
| 2007/0082393 A1 | 4/2007 | Lodhi et al. |
| 2007/0129751 A1 | 6/2007 | Muni et al. |
| 2007/0178788 A1 | 8/2007 | Link et al. |
| 2007/0204769 A1 | 9/2007 | Wong et al. |
| 2007/0237807 A1 | 10/2007 | Luu et al. |
| 2008/0008865 A1 | 1/2008 | Luu et al. |
| 2008/0076313 A1 | 3/2008 | Uitenbroek et al. |
| 2008/0076314 A1 | 3/2008 | Blanz et al. |
| 2008/0076868 A1 | 3/2008 | Green et al. |
| 2008/0107698 A1 | 5/2008 | Luu et al. |
| 2008/0110822 A1 | 5/2008 | Chung et al. |
| 2008/0157036 A1 | 7/2008 | Ogawa et al. |
| 2008/0179790 A1 | 7/2008 | Wong et al. |
| 2008/0187739 A1 | 8/2008 | Baker et al. |
| 2008/0307971 A1 | 12/2008 | Horie et al. |
| 2009/0004393 A1 | 1/2009 | Mollinger et al. |
| 2009/0032475 A1 | 2/2009 | Ferrer et al. |
| 2009/0062413 A1 | 3/2009 | Adur et al. |
| 2009/0065436 A1 | 3/2009 | Kalayci et al. |
| 2009/0110843 A1 | 4/2009 | Halahmi et al. |
| 2009/0130377 A1 | 5/2009 | Samanta et al. |
| 2010/0021513 A1 | 1/2010 | Garois et al. |
| 2010/0064645 A1 | 3/2010 | Chung et al. |
| 2010/0116179 A1 | 5/2010 | Baker et al. |
| 2010/0178507 A1 | 7/2010 | Ferrer et al. |
| 2010/0269995 A1 | 10/2010 | Gupta et al. |
| 2011/0009532 A1 | 1/2011 | Luethge et al. |
| 2011/0042316 A1 | 2/2011 | Chen et al. |
| 2011/0047719 A1* | 3/2011 | Yeh ............ D01F 1/10 8/497 |
| 2011/0067369 A1* | 3/2011 | Chung ............ B01D 39/086 55/486 |
| 2011/0230586 A1 | 9/2011 | Schwalm et al. |
| 2012/0085567 A1 | 4/2012 | Lintz et al. |
| 2013/0068687 A1 | 3/2013 | Shenoy et al. |
| 2013/0199992 A1 | 8/2013 | Chung et al. |
| 2013/0251992 A1* | 9/2013 | Kono ............ D01D 5/092 428/364 |

(56) References Cited

U.S. PATENT DOCUMENTS

| | | |
|---|---|---|
| 2014/0196420 A1 | 7/2014 | Chung et al. |
| 2014/0230390 A1 | 8/2014 | Shenoy et al. |
| 2015/0013295 A1 | 1/2015 | Uchiyama et al. |

FOREIGN PATENT DOCUMENTS

| | | |
|---|---|---|
| CA | 2264675 A1 | 1/1998 |
| CA | 2295100 A1 | 12/1998 |
| CA | 2335580 A1 | 12/1999 |
| CA | 2336246 A1 | 12/1999 |
| CA | 2365444 A1 | 9/2000 |
| CA | 2382274 A1 | 3/2001 |
| CA | 2025430 C | 5/2001 |
| CA | 2419779 A1 | 3/2002 |
| CA | 2419802 A1 | 3/2002 |
| CA | 2570132 A1 | 12/2005 |
| CA | 2570670 A1 | 12/2005 |
| CA | 2517552 A1 | 3/2006 |
| CA | 2529822 A1 | 6/2006 |
| CA | 2605155 A1 | 10/2006 |
| CA | 2358668 C | 12/2006 |
| CA | 2630112 A1 | 8/2007 |
| CA | 2853954 A1 | 11/2007 |
| CA | 2653597 A1 | 1/2008 |
| CA | 2628054 A1 | 3/2008 |
| CA | 2675343 A1 | 7/2008 |
| CA | 2710273 A1 | 7/2009 |
| CA | 2419784 C | 8/2010 |
| CA | 2709631 A1 | 1/2011 |
| CA | 2450016 C | 2/2011 |
| CA | 2419770 C | 6/2011 |
| CN | 1177032 A | 3/1998 |
| CN | 1185180 C | 1/2005 |
| CN | 1203925 C | 6/2005 |
| CN | 1232335 C | 12/2005 |
| CN | 1318512 C | 5/2007 |
| CN | 101175634 A | 5/2008 |
| CN | 101325934 A | 12/2008 |
| CN | 101478876 A | 7/2009 |
| CN | 101517022 A | 8/2009 |
| CN | 1964827 B | 5/2010 |
| CN | 102414369 A | 4/2012 |
| CN | 102460603 A | 5/2012 |
| CN | 1997558 B | 6/2012 |
| CN | 101478953 B | 10/2012 |
| DE | 4129326 A1 | 3/1993 |
| DE | 69620173 T2 | 11/2002 |
| DE | 69716953 T2 | 8/2003 |
| EP | 0 351 046 A2 | 1/1990 |
| EP | 0 489 395 A1 | 6/1992 |
| EP | 0418093 B1 | 1/1995 |
| EP | 0 559 128 B1 | 5/1995 |
| EP | 0851950 B1 | 9/1999 |
| EP | 1036492 A1 | 9/2000 |
| EP | 1 294 561 B1 | 6/2001 |
| EP | 0830327 B1 | 3/2002 |
| EP | 1201380 A2 | 5/2002 |
| EP | 0958116 B1 | 11/2002 |
| EP | 1305991 A1 | 5/2003 |
| EP | 1164826 B1 | 10/2004 |
| EP | 1245547 B1 | 6/2005 |
| EP | 1280852 B1 | 7/2005 |
| EP | 1089985 B1 | 9/2005 |
| EP | 1236564 B1 | 4/2006 |
| EP | 1672656 A2 | 6/2006 |
| EP | 1733776 A2 | 12/2006 |
| EP | 1317317 B1 | 5/2007 |
| EP | 1326698 B1 | 5/2007 |
| EP | 1795249 A1 | 6/2007 |
| EP | 1404514 B1 | 8/2007 |
| EP | 1467861 B1 | 5/2008 |
| EP | 1755844 B1 | 3/2010 |
| EP | 2202358 A1 | 6/2010 |
| EP | 1893793 B1 | 9/2010 |
| EP | 2 287 372 A1 | 2/2011 |
| EP | 1275778 B1 | 2/2011 |
| EP | 2308582 A1 | 4/2011 |
| EP | 2225076 B1 | 7/2011 |
| EP | 1448841 B1 | 12/2011 |
| EP | 2402379 A1 | 1/2012 |
| EP | 1358272 B1 | 11/2012 |
| GB | 584 985 A | 1/1947 |
| GB | 854 987 A | 11/1960 |
| GB | 1 376 756 A | 12/1974 |
| GB | 1 379 875 A | 1/1975 |
| GB | 1 424 698 Z | 2/1976 |
| GB | 2464085 A | 4/2010 |
| JP | H06-010213 A | 1/1994 |
| JP | 10317275 A | 12/1998 |
| JP | 2003-336127 A | 11/2003 |
| JP | 2004-508447 A | 3/2004 |
| JP | 2005-527358 A | 9/2005 |
| JP | 4167897 B2 | 10/2008 |
| JP | WO 2012073737 A1 * | 6/2012 ............ D01D 5/092 |
| JP | 5009479 B2 | 8/2012 |
| KR | 2002-069346 A | 8/2002 |
| KR | 10-2007-029195 A | 3/2007 |
| KR | 10-2007-037442 A | 4/2007 |
| KR | 10-0774863 B1 | 11/2007 |
| KR | 10-2008-027229 A | 3/2008 |
| KR | 10-0811569 B1 | 3/2008 |
| KR | 10-0819356 B1 | 4/2008 |
| KR | 10-0887167 B1 | 3/2009 |
| KR | 10-0924484 B1 | 11/2009 |
| KR | 10-0930327 B1 | 12/2009 |
| RU | 2008127494 A | 1/2010 |
| WO | WO 93/04007 A1 | 3/1993 |
| WO | WO 94/04330 A1 | 3/1994 |
| WO | WO 94/18364 A1 | 8/1994 |
| WO | WO 95/04709 A1 | 2/1995 |
| WO | WO 96/20971 A1 | 7/1996 |
| WO | WO 96/40599 A1 | 12/1996 |
| WO | WO 98/00272 A1 | 1/1998 |
| WO | WO 98/58769 A1 | 12/1998 |
| WO | WO 99/36620 A1 | 7/1999 |
| WO | WO 99/62705 A1 | 12/1999 |
| WO | WO 00/43132 A1 | 7/2000 |
| WO | WO 00/54568 A1 | 9/2000 |
| WO | WO 01/16048 A1 | 3/2001 |
| WO | WO 01/29312 A1 | 4/2001 |
| WO | WO 02/20133 A2 | 3/2002 |
| WO | WO 02/20135 A2 | 3/2002 |
| WO | WO 02/20668 A2 | 3/2002 |
| WO | WO 02/34848 A1 | 5/2002 |
| WO | WO 03/002338 A1 | 1/2003 |
| WO | WO 03/061964 A1 | 7/2003 |
| WO | WO 2005/063502 A2 | 7/2005 |
| WO | WO 2005/120787 A1 | 12/2005 |
| WO | WO 2005/120967 A1 | 12/2005 |
| WO | WO 2006/111458 A1 | 10/2006 |
| WO | WO 2006/126930 A1 | 11/2006 |
| WO | WO 2007/020644 A1 | 2/2007 |
| WO | WO 2007/020657 A1 | 2/2007 |
| WO | WO 2007/097818 A2 | 8/2007 |
| WO | WO 2007/097924 A2 | 8/2007 |
| WO | WO 2007/126777 A2 | 11/2007 |
| WO | WO 2008/002420 A2 | 1/2008 |
| WO | WO 2008/036473 A1 | 3/2008 |
| WO | WO 2008/088815 A1 | 7/2008 |
| WO | WO 2008/143100 A1 | 11/2008 |
| WO | WO 2009/006163 A2 | 1/2009 |
| WO | WO 2009/064767 A2 | 5/2009 |
| WO | WO 2009/147415 A1 | 12/2009 |
| WO | WO 2009/152439 A1 | 12/2009 |
| WO | WO 2010/123580 A1 | 10/2010 |
| WO | WO 2010/141757 A2 | 12/2010 |
| WO | WO 2012/001154 A1 | 1/2012 |
| WO | WO 2012/131370 A1 | 10/2012 |
| WO | WO 2013/043987 A1 | 3/2013 |
| WO | WO 2013/044014 A1 | 3/2013 |

OTHER PUBLICATIONS

U.S. Appl. No. 61/537,171, filed Sep. 21, 2011, Shenoy.

(56) References Cited

OTHER PUBLICATIONS

International Search Report and Written Opinion for PCT/US2012/056511, issued by the European Patent Office, dated Dec. 12, 2012: 9 pgs.

International Search Report and Written Opinion for PCT/US2012/056545, issued by the United States Patent Office, dated Jan. 18, 2013: 14 pgs.

International Search Report and Written Opinion for PCT/US2014/020727, issued by the United States Patent Office, dated May 26, 2014: 14 pgs.

"CYMEL® Amino Resin Crosslinkers for the Coating Industry," Product and Application Guide [online]. Cytec Industries, Inc., Woodland Park, NJ, 2008 [retrieved on Feb. 1, 2013]. Retrieved from the Internet: <cytec.com/liquids/Downloads/CYMEL_AminoResinCrosslinkers.pdf>; 42pgs.

Lee et al., "Preparation and characterization of poly(vinyl alcohol) nanofiber mats crosslinked with blocked isocyanate prepolymer," *Polymer International Barking*, Jan. 1, 2010;59: 1583-1684.

"Donaldson® Torit® Ultra-Web®" datasheet. Donaldson Company, Inc., Minneapolis, MN 2007; 6 pgs.

Reneker et al., "Nanometre diameter fibres of polymer, produced by electrospinning," *Nanotechnology*, 1996;7:216-223.

Partial European Search Report for EP Application No. 128331774, dated Mar. 5, 2015; 5 pages.

\* cited by examiner

FINE FIBERS MADE FROM REACTIVE ADDITIVES

RELATED APPLICATION

This application claims the benefit under 35 U.S.C. § 119(e) of U.S. Provisional Patent Application No. 61/775,535 filed on Mar. 9, 2013 titled FINE FIBERS MADE FROM REACTIVE ADDITIVES, which is hereby incorporated by reference in its entirety.

BACKGROUND OF THE DISCLOSURE

Polymer webs have been made by electrospinning, rotary spinning, centrifugal spinning, melt spinning, extrusion melt spinning, air laid processing, or wet laid processing. The filtration efficiency of such filters is characteristic of the filtration media and is related to the fraction of the particulate removed from the mobile fluid stream.

Fine fiber technologies that contemplate polymeric materials mixed or blended with a variety of other substances are known. Certain of the disclosed fibers comprise an axial core or a polymeric material. Surrounding the axial core can be found a layer of a coating material such as a phenolic oligomer or a fluoropolymer component. While many of these fine fiber materials have adequate performance for a number of filtration end uses, in applications with extremes of temperature ranges, where mechanical stability is required, improvements in fiber properties is still needed.

SUMMARY

The present disclosure provides a unique fine fiber material that is formed from a fiber-forming polymer material with at least two reactive additives that are capable of reacting with each other, for example, in a fiber-forming process or in a post-treatment process. Such reactive additives provide a facile mechanism for manufacturing fine fibers with unique properties.

The present disclosure provides methods of making fine fibers.

In one embodiment of the present disclosure, there is provided a method of making fine fibers, wherein the method includes: providing at least one fiber-forming polymer; providing at least two reactive additives reactive with each other, and optionally reactive with the fiber-forming polymer; and combining the at least one fiber-forming polymer and the at least two reactive additives under conditions effective to form a plurality of fine fibers.

In another embodiment of the present disclosure, there is provided a method of making fine fibers, wherein the method includes: providing at least one fiber-forming polymer; providing at least two reactive additives reactive with each other, and optionally reactive with the fiber-forming polymer; and combining the at least one fiber-forming polymer and the at least two reactive additives under conditions effective to form a plurality of fine fibers.

The present disclosure also provides fine fibers prepared according to methods disclosed herein.

In one embodiment of the present disclosure, there is provided a fine fiber prepared by a method that includes: providing at least one fiber-forming polymer; providing at least two reactive additives reactive with each other, wherein at least one of the reactive additives is reactive with the at least one fiber-forming polymer; and combining the at least one fiber-forming polymer and the at least two reactive additives to form a plurality of fine fibers.

In another embodiment of the present disclosure, there is provided a fine fiber prepared by a method that includes: providing at least one fiber-forming polymer; providing at least two reactive additives reactive with each other, and not reactive with the at least one fiber-forming polymer; and combining the at least one fiber-forming polymer and the at least two reactive additives to form a plurality of fine fibers.

The present disclosure also provides fine fibers, filter media, and filter elements.

In one embodiment, there is provided a fine fiber that includes: at least one fiber-forming polymer; at least two reactive additives that are covalently bonded to each other and optionally covalently bonded to the fiber-forming polymer; at least one of the reactive additives is self-condensed; wherein at least one of the reactive additives enhances at least one property of the fine fiber compared to the fine fiber without such reactive additive.

In another embodiment, there is provided a fine fiber that includes a core phase and a coating phase, wherein; the core phase comprises at least one fiber-forming polymer and the coating phase comprises at least one surface-migrating agent; the fiber includes at least a second additive that is covalently bonded to the surface-migrating agent and optionally is covalently bonded to the fiber-forming polymer, and enhances at least one property of the fine fiber compared to the fiber without such additive; at least a portion of the at least one fiber-forming polymer is cross-linked by at least one of the surface-migrating agent and the second additive.

In certain embodiments, one or more reactive additives are selected to "enhance" one or more properties of the fibers compared to the fibers without the reactive additive(s). This means that one or more reactive additives are selected to simply enhance one or more properties the fibers already possessed. This also means that one or more reactive additives are selected to provide the resultant fine fibers with one or more properties such fibers would not possess without the reactive additive(s). Thus, "enhancing" in this context means improving or creating one or more properties.

In certain embodiments of the present disclosure, one or more of the following is true: at least one of the reactive additives is not a resinous aldehyde composition; if at least one of the fiber-forming polymers is a polyamide, then none of the reactive additives is a polyamide; at least one of the reactive additives has a weight average molecular weight of less than 3000 Daltons; and at least one of the reactive additives is tri-functional or higher.

The present disclosure also provides a filter media that includes a filtration substrate and a layer including a plurality of the fine fibers described herein disposed on the substrate.

The present disclosure also provides a filter element that includes a filter media described herein.

Herein, a "fine" fiber has an average fiber diameter of less than 5 microns. Typically, this means that a sample of a plurality of fibers of the present disclosure has an average fiber diameter of less than 5 microns. In certain embodiments, such fibers have an average diameter of up to 2 microns, up to 1 micron, up to 0.8 micron, or up to 0.5 micron. In certain embodiments, such fibers have an average diameter of at least 0.05 micron, or at least 0.1 micron.

Herein, a "fiber-forming" polymer (e.g., homopolymer or copolymer) is one that is capable of forming a fine fiber in the absence of the reactive additives.

Herein, "reactive additive" refers to monomers, oligomers, and/or polymers, that include functional groups capable of reacting with functional groups of other reactive additives, and optionally with the fiber-forming polymer. Reactive additives are not fiber-forming themselves at the concentration of the reactive additive used (relative to fiber-forming polymer(s)).

Typically, such concentrations used are reported as weight ratios. Typically, the amount of reactive additive(s) relative to the fiber-forming polymer(s) is at least 0.5:100, or at least 1:100, or at least 5:100, or at least 10:100, or at least 20:100 (weight ratio). Typically, the amount of reactive additive(s) relative to the fiber-forming polymer(s) is up to 50:100, or up to 200:100 (weight ratio), or even higher.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings.

FIG. 1 compares the SEM images of the fibers obtained from Example 1 ("1133:polyamide 651=0.4:1") and a fiber of Example 5 ("1133:polyamide 651=0.4:1" and PF7002:1133=0.5:1).

Figure 2:
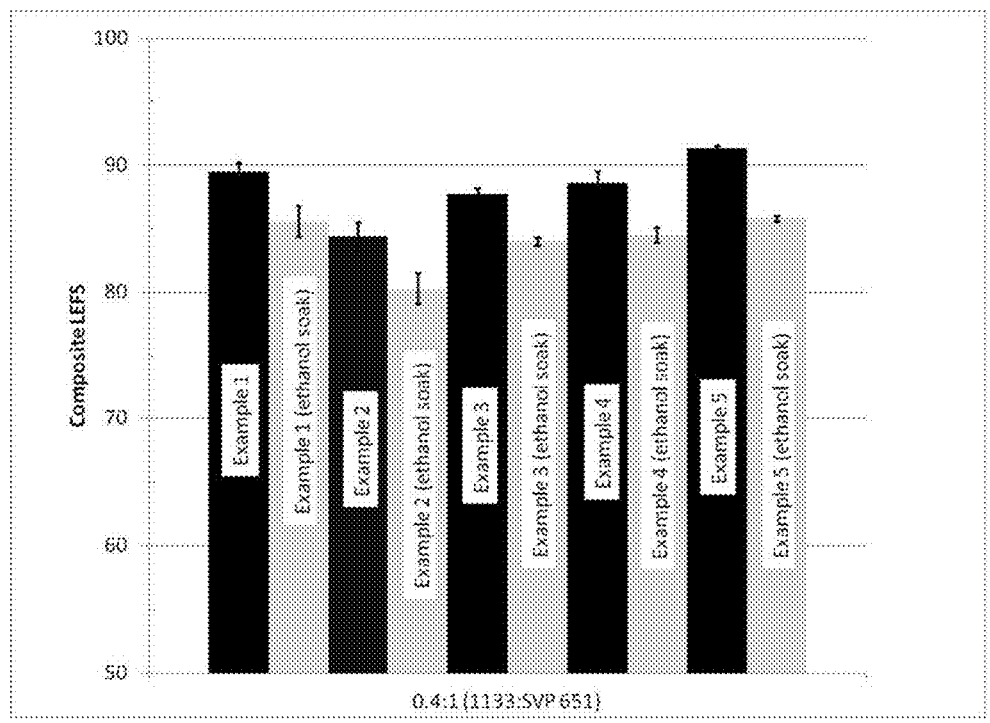

FIG. 2 graphically shows the filtration efficiency (LEFS) for the fine fibers and substrate both pre- and post-ethanol soak for Examples 1-5.

Figure 3:
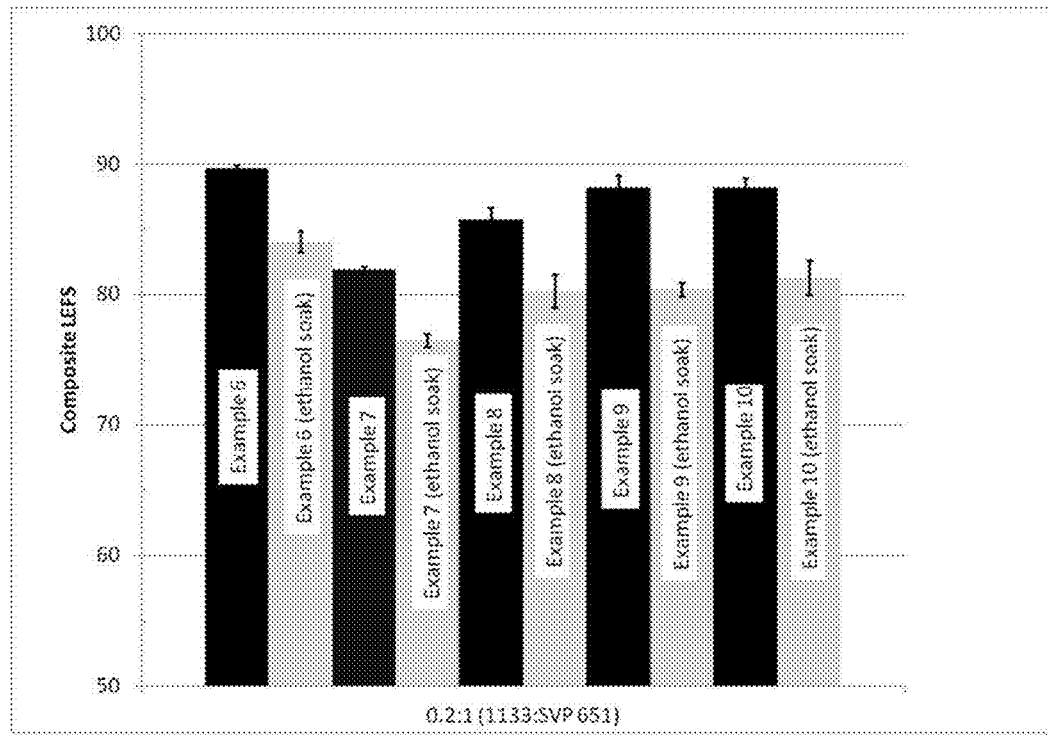

FIG. 3 graphically shows the filtration efficiency (LEFS) for the fine fibers and substrate both pre- and post-ethanol soak for Examples 6-10.

Figure 4:
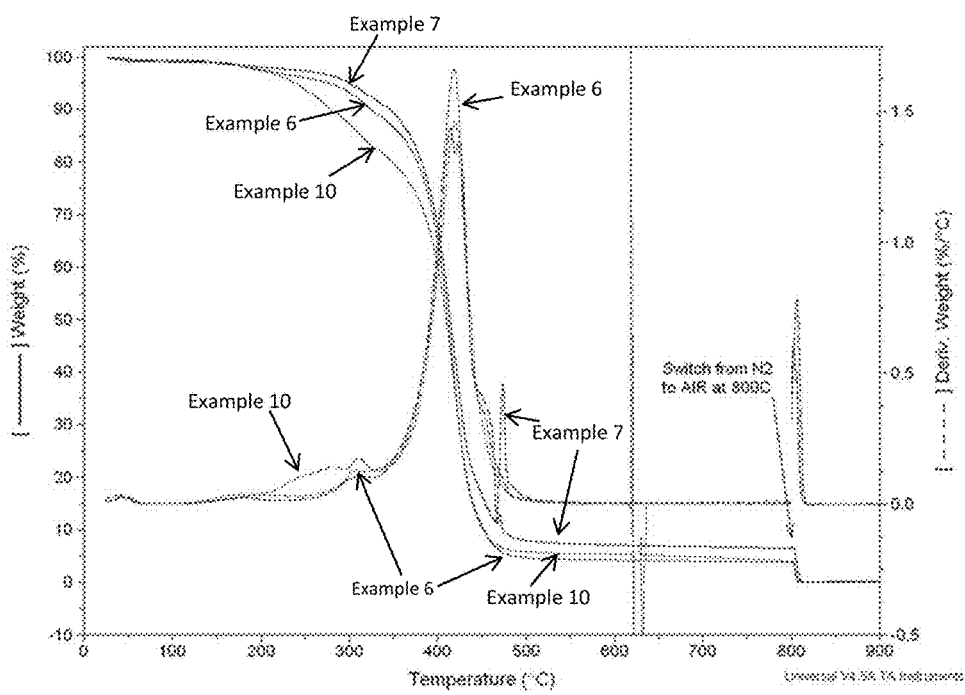

FIG. 4 compares the thermogravimetric results (TGA) of the fine fibers prepared in Examples 17-19 using fibers as prepared in Examples 6, 7, and 10.

Figure 5:
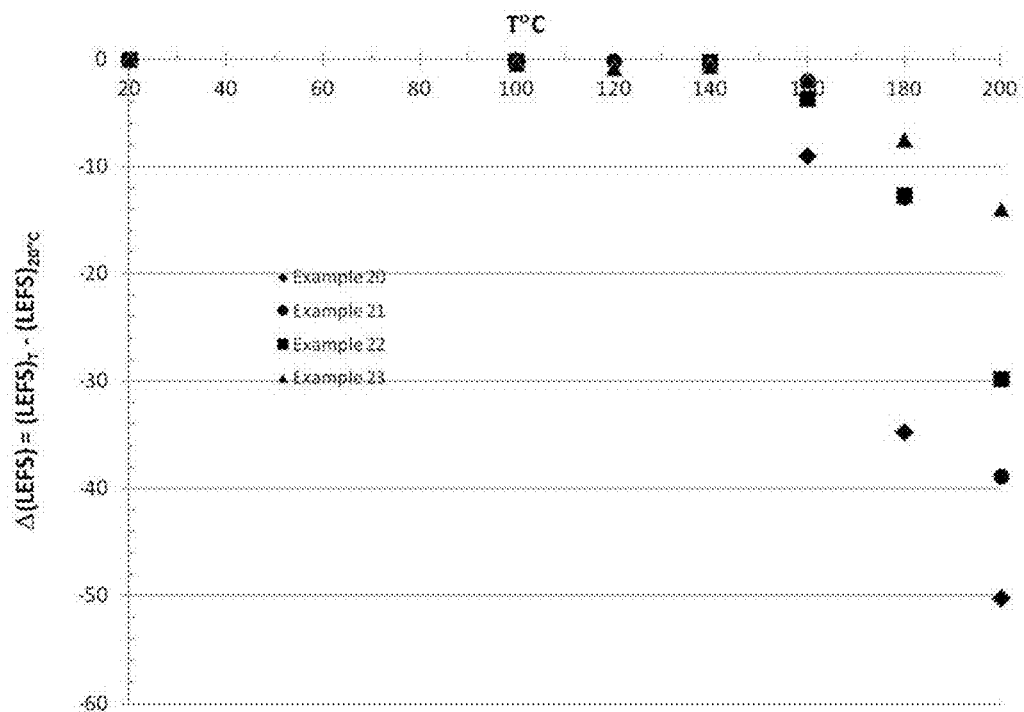

FIG. 5 compares the particulate efficiencies (LEFS) as a representation of thermal and/or substrate off-gassing resistance of the fine fibers on cellulose in Examples 20-23.

Figure 6:
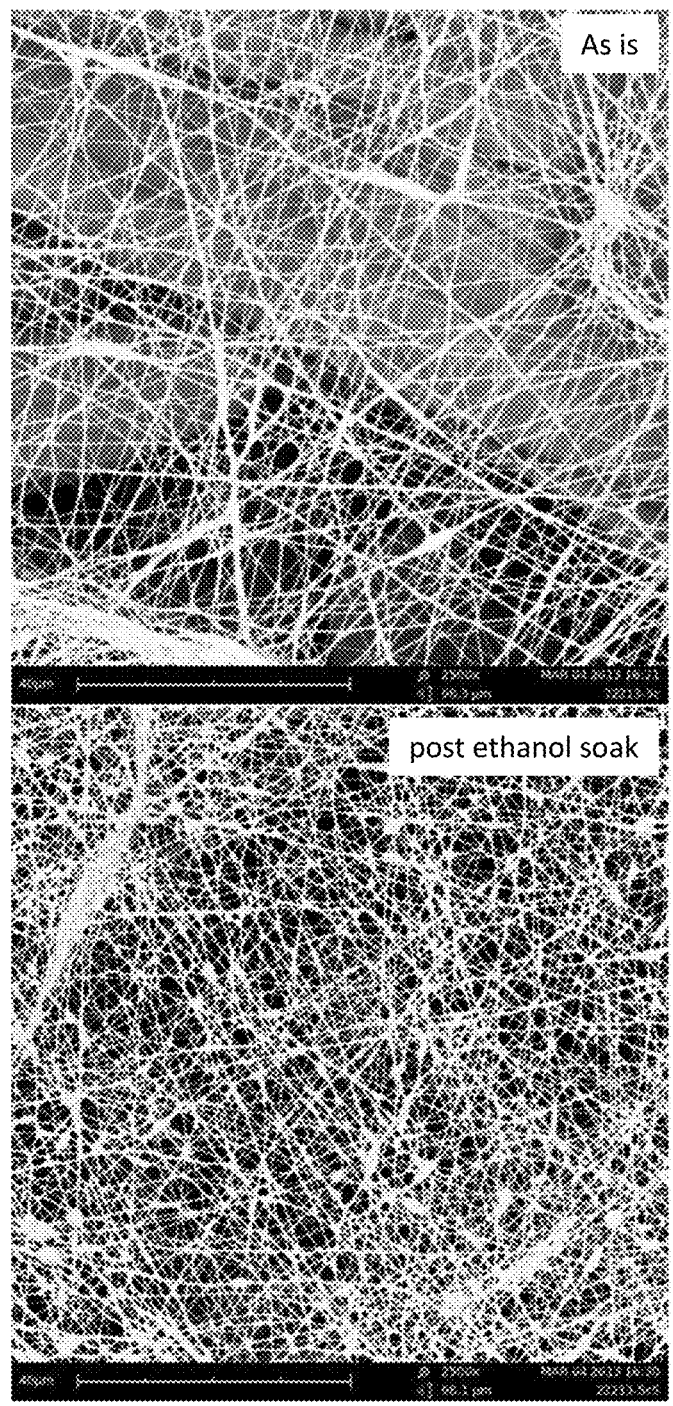

FIG. 6 compares the SEM images of the fibers pre- and post-ethanol soak obtained in Example 24.

Figure 7:
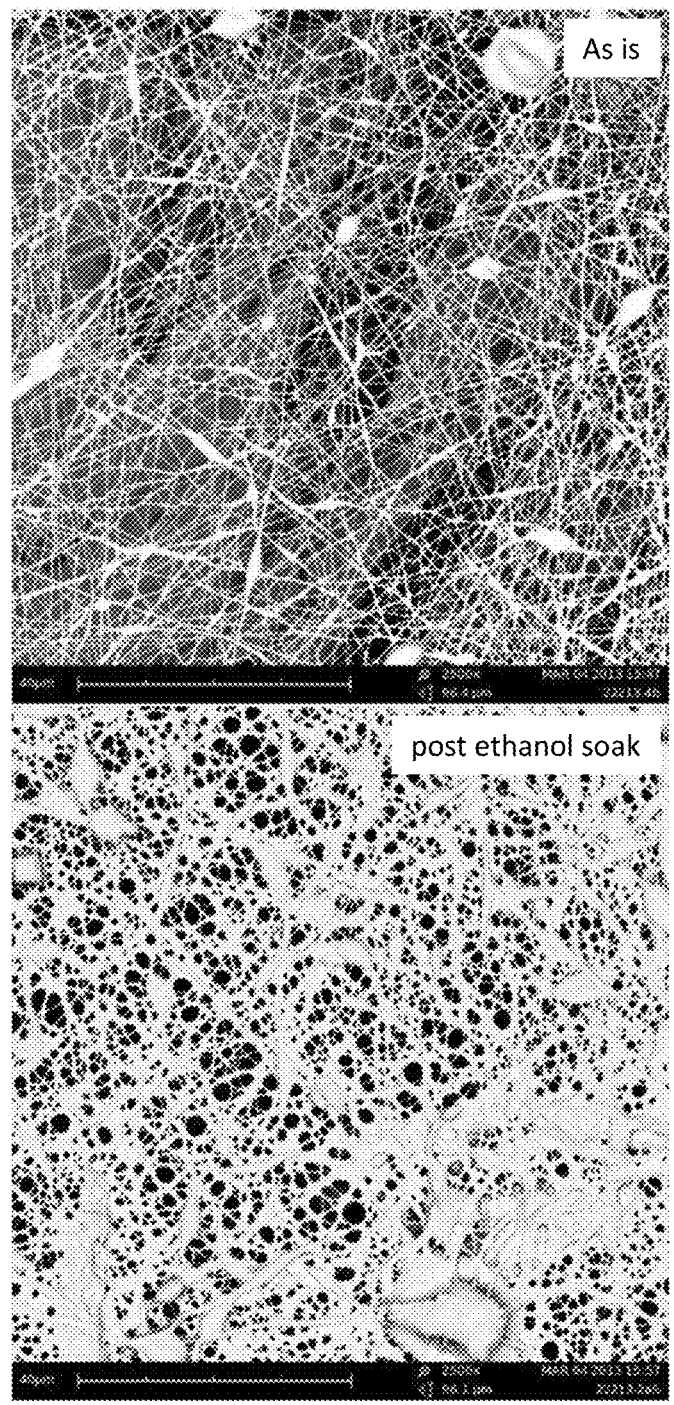

FIG. 7 compares the SEM images of the fibers pre- and post-ethanol soak obtained in Example 25.

Figure 8:
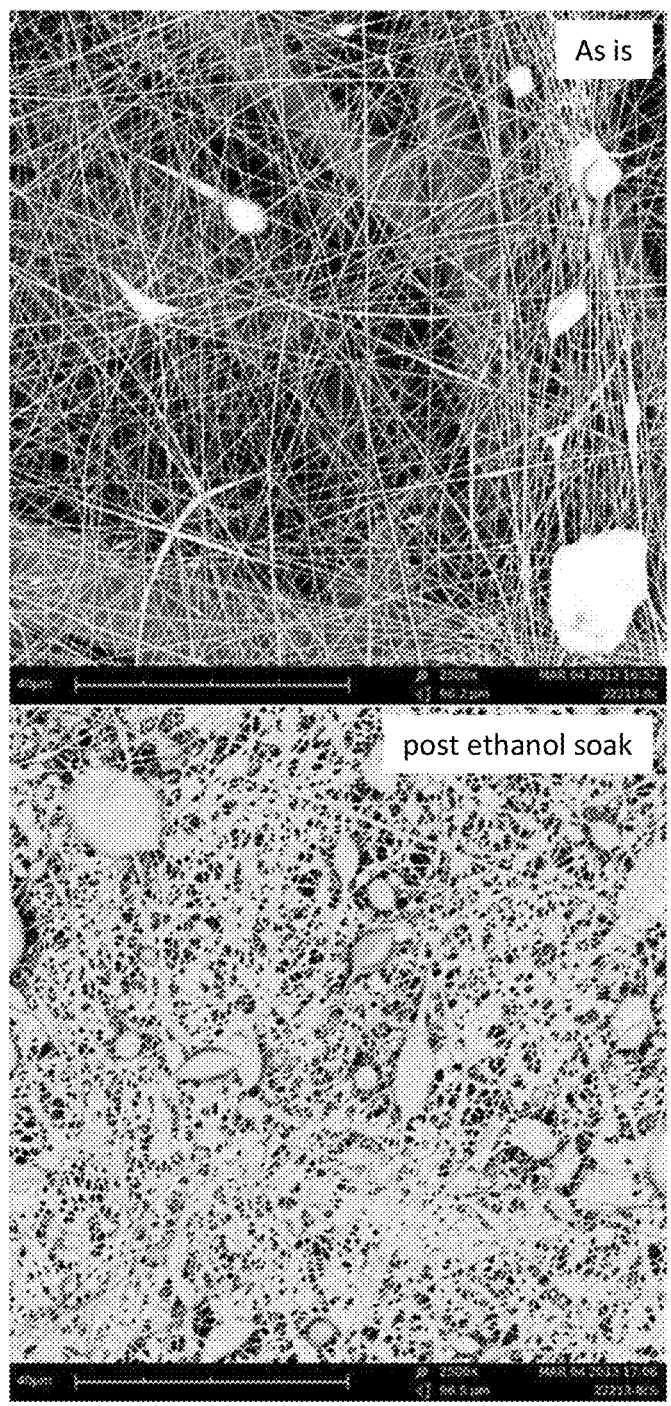

FIG. 8 compares the SEM images of the fibers pre- and post-ethanol soak obtained in Example 26.

Figure 9:
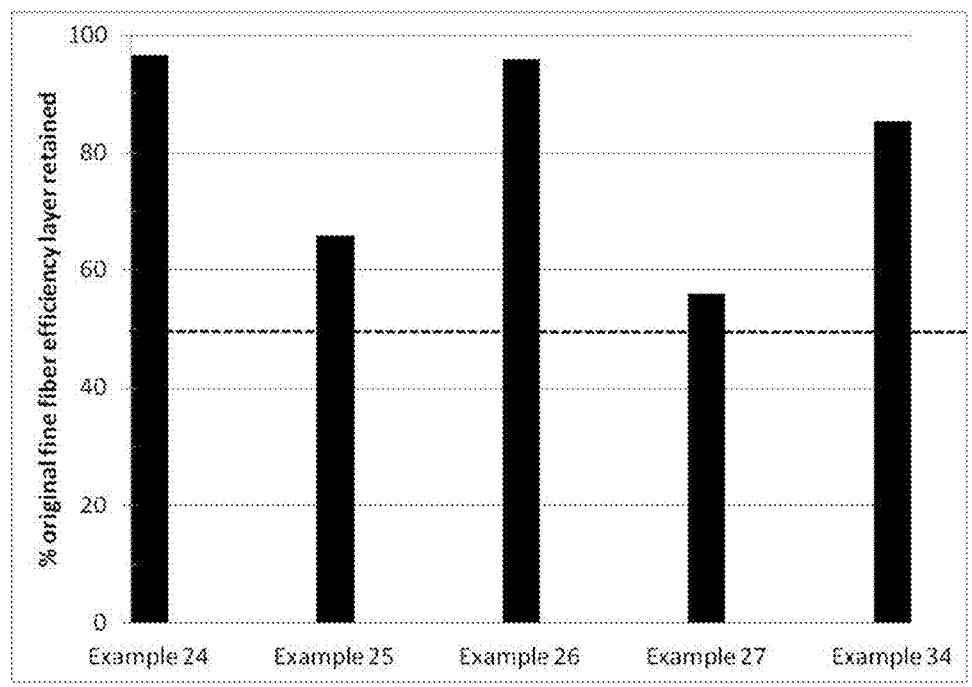

FIG. 9 graphically shows the filtration efficiency (LEFS) for the fine fibers both pre- and post-ethanol soak for Examples 24-27 and 34.

Figure 10:
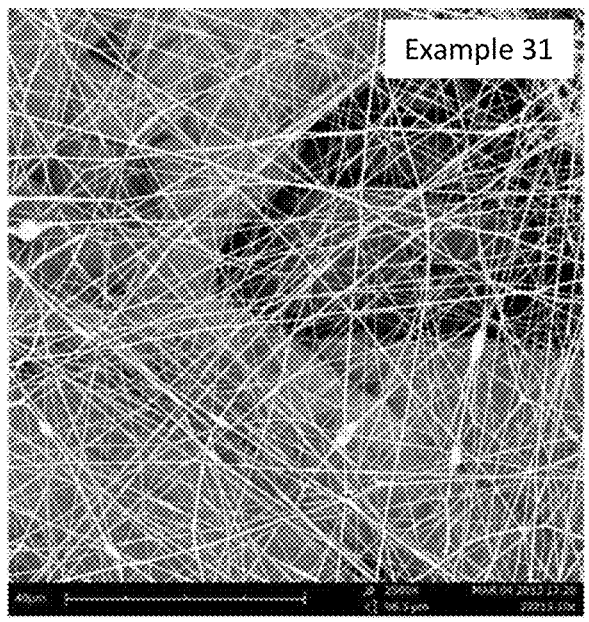

FIG. 10 shows the SEM image of the fibers obtained in Example 31.

Figure 11:
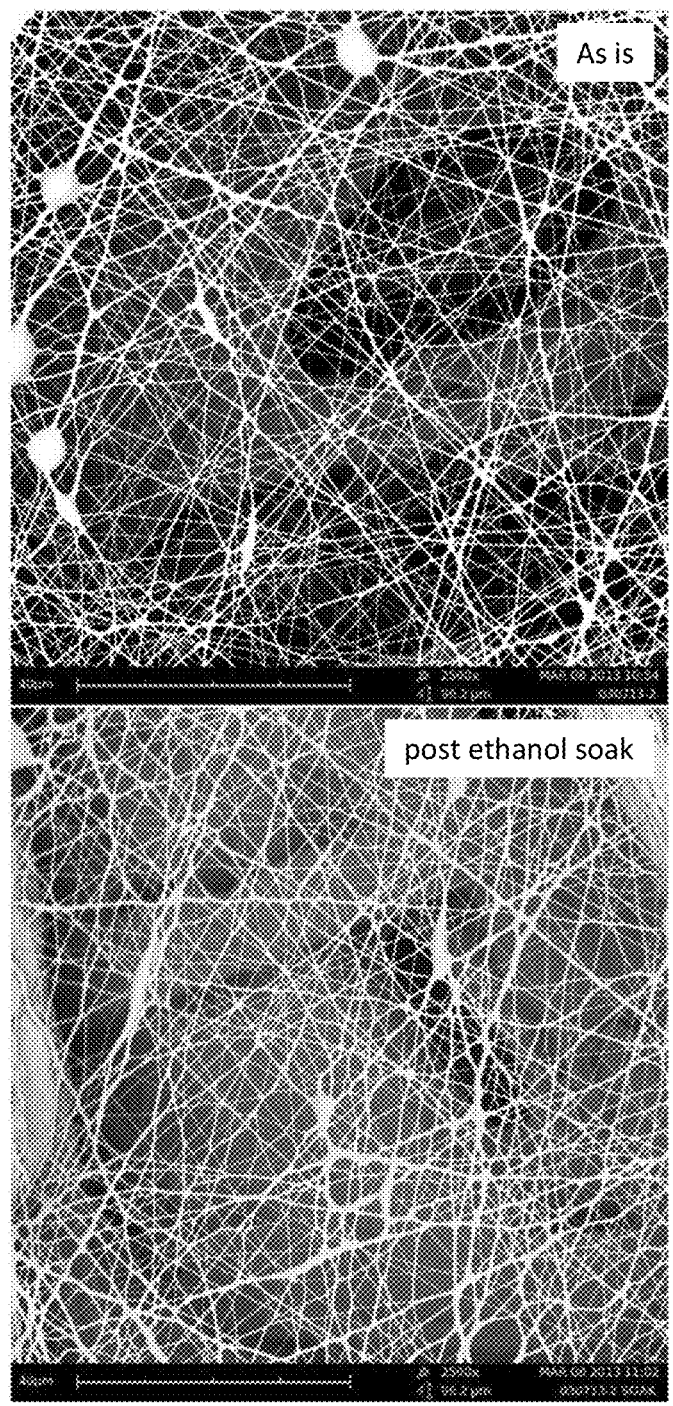

FIG. 11 compares the SEM images of the fibers pre- and post-ethanol soak obtained in Example 34.

DETAILED DESCRIPTION OF ILLUSTRATIVE EMBODIMENTS

The present disclosure provides a unique fine fiber material that is formed from a fiber-forming polymer with at least two reactive additives that are capable of reacting with each other, for example, in a fiber-forming process or in a post-treatment process. The reactive additives may also be selected such that one or more of them reacts with the fiber-forming polymer (e.g., by crosslinking). Such reactive additives provide a facile mechanism for manufacturing fine fibers with enhanced properties (including properties such fibers may not have previously displayed).

In certain embodiments of the present disclosure, a fine fiber includes at least one fiber-forming polymer, and at least two reactive additives that are covalently bonded to each other and optionally covalently bonded to the fiber-forming polymer. In certain embodiments, at least one of the reactive additives is self-condensed.

In certain embodiments of the present disclosure, a fine fiber includes a core phase and a coating phase, wherein the core phase includes at least one fiber-forming polymer and the coating phase includes at least one surface-migrating agent (an example of a reactive additive). In such fibers, at least a second additive is used that is covalently bonded to the surface-migrating agent and optionally it is covalently bonded to the fiber-forming polymer. In certain embodiments, at least a portion of the fiber-forming polymer is crosslinked by at least one of the surface-migrating agent and the second additive, thereby forming a crosslinked fiber with a core-shell configuration.

In certain embodiments, the reactive additives can covalently bond with each other, with the fiber-forming polymer, or both, to form a crosslinked network. Thus, crosslinking as used herein, does not require covalent bonding between the fiber-forming polymer and one of more of the reactive additives.

The reactive additives are typically selected such that at least one of them enhances (e.g., improves or creates) at least one property of the fine fiber compared to the fine fiber without such reactive additive.

Appropriate choice of the reactive additives can produce a fiber protective layer (e.g. hydrophobic, oleophobic, chemical resistance, thermal resistance) in, for example, a core-shell configuration.

In certain embodiments, at least one of the reactive additives is not a resinous aldehyde composition. In certain embodiments, if at least one of the fiber-forming polymers is a polyamide, then none of the reactive additives is a polyamide.

Reactive Additives

Herein, "reactive additive" refers to monomers, oligomers, and/or polymers, that include functional groups capable of reacting with functional groups of other reactive additives, and optionally with the fiber-forming polymer. Herein, the term "reactive additive" refers to the starting material as well as the material in the final fibers. It will be understood that in the final fibers, at least a portion of the reactive additive will be covalently bonded to another reactive additive and optionally covalently bonded (e.g., as in crosslinking) with the active sites (e.g., active hydrogens) on a fiber-forming polymer.

In certain embodiments, the reactive additive is a monomer, oligomer, or small molecular weight polymer. For example, in certain embodiments, the reactive additive has a weight average molecular weight of less than 3000 Daltons. In certain embodiments, all of the reactive additives used to make the fine fibers have a weight average molecular weight of less than 3000 Daltons.

In certain embodiments, preferred reactive additives are substantially nonvolatile at room temperature and pressure.

Reactive additives are selected such that they are preferably soluble in a solvent chosen for the polymer material for processing, such as in electrospinning.

A particularly preferred example of a reactive additive, for forming fibers that have at least two phases (e.g., a core phase and a coating phase), is a surface-migrating agent. Surface-migrating agents are compounds that are capable of migrating to the surface of a fine fiber, typically during fiber formation.

Reactive additives can have a variety of reactive functional groups. For example, they can include alkoxy groups, hydroxyl groups, acid groups (e.g., carboxylic acid groups), isocyanate groups, diglycidyl ether groups, dichloro groups. Any one molecule of a compound that functions as a reactive additive can include one or more of one type of functional group or two or more different functional groups. A reactive additive can include a mixture of compounds with differing numbers or types of functional groups. A hydroxyl-functional component can include a diol, a triol, a polyol, or a mixture thereof. A carboxylic acid-functional component can include a compound with multiple carboxylic acid groups (e.g., a diacid, a triacid, or a mixture thereof). A glycidyl ether-functional component can include a compound with multiple glycidyl ether groups (e.g., a diglycidyl ether, a triglycidyl ether, or a mixture thereof). An amine-functional component can include a primary amine compound, a secondary amine compound, a tertiary amine compound, or a mixture thereof. An amine-functional component can include a compound with multiple primary, secondary, or tertiary amine groups (e.g., a diamine, a triamine, or a mixture thereof). An isocyanate-functional component can include a compound with multiple isocyanate groups (e.g., a diisocyanate, a triisocyanate, or a mixture thereof). In addition, a reactive additive may have more than one type of reactive functional group. For example, citric acid and dimethylolpropionic acid have both hydroxyl and carboxylic acid groups.

In certain embodiments, at least one of the reactive additives is tri-functional or higher. By this it is meant, the reactive additive has three or more reactive functional groups per molecule. For example, 1,1,1-trimethylolpropane is a tri-functional alkoxy-containing compound; glycerol, pentaerythritol, erthitol, threitol, dipentaerythitol, sorbitol are multi-functional hydroxyl-containing reactive additives; citric acid and dimethylolpropionic acid are multi-functional carboxyl acid-containing reactive additives; trimethylolpropane triglycidyl ether is a tri-functional glycidyl ether-containing reactive additive; triphenylmethane triisocyanate is a tri-functional isocyanate-containing reactive additive; and triethylenetetramine, trimethylol propane, and tris(poly (propylene glycol) amine terminated) ether are multi-functional amine-containing reactive additives.

The following are examples of various reactive additives categorized by functional groups: (I) alkoxy-functional; (II) hydroxyl-functional; (III) acid-functional; (IV) glycidyl ether-functional; (V) isocyanate-functional; (VI) amine-functional; and (VII) dichloro-functional. Various reactive combinations (i.e., combinations of materials that are reactive with each other) can be used in making fine fibers of the present disclosure. For example, one or more reactive additives from Group (I) can be reacted one or more reactive additives from Group (II) and/or (III) and/or (IV) and/or (V) and/or (VI). One or more reactive additives from Group (II) can be reacted one or more reactive additives from Group (III) and/or (IV) and/or (V) and/or (VI) and/or (VII). One or more reactive additives from Group (III) can be reacted one or more reactive additives from Group (IV) and/or (V) and/or (VI) and/or (VII).

(I) Alkoxy-Functional Reactive Additives

Alkoxy-functional reactive additives can include resinous aldehydes as well as compounds such as 1,1,1-trimethylolpropane, alkoxy silanes, and alkoxy titanates, including ethoxy-containing fluorinated compounds such as those available under the tradenames FOMBLIN PFPE FUNCTIONAL and FLUOROLINK from Solvay.

A preferred alkoxy-functional reactive additive is a resinous aldehyde. Herein, "resin" or "resinous" refers to monomers, oligomers, and/or polymers. Herein, the term "resinous aldehyde composition" refers to the starting material as well as the material in the final fibers. Resinous aldehydes not only are capable of crosslinking certain (reactive) fiber-forming polymers, they can self-condense, and they can migrate to the surface of a fine fiber during fiber formation.

Suitable resinous aldehyde compositions include two or more alkoxy groups per molecule. Exemplary resinous aldehyde compositions are synthetic resins made by treating various aldehydes with a reactant under condensation reaction conditions. Useful such reactants include phenol, urea, aniline, benzoguanamine, glycoluril, and melamine. Useful resinous aldehyde compositions include aldehyde-based agents that can be used in crosslinking reactions. The resinous aldehyde compositions are typically nonvolatile. The resinous aldehyde compositions (when combined with polymers such as nylon, as described in greater detail below) are preferably soluble in a solvent chosen for the polymer material for processing, such as in electrospinning. Resinous aldehyde compositions useful as reactive additives include a condensation product of urea and an aldehyde, a condensation product of phenol and an aldehyde, or a condensation product of melamine and an aldehyde. One useful class includes resins based on nitrogen compounds such as melamine, urea, benzoguanamine, glycoluril, and other similar resins manufactured by reacting an aldehyde with a nitrogen compound. Such amine-based resins are soluble in process solvents and possess reactivity with a variety of polymer species.

Useful resinous aldehyde compositions (e.g., melamine-aldehyde compositions) include compounds and mixtures containing alkoxy groups such as highly methylated melamine; partially methylated melamine; methylated high imino melamine; highly alkylated mixed ether melamine; highly alkylated carboxylated, high imino mixed ether melamine; highly n-butylated melamine; n-butylated high imino and partially n-butylated melamine; partially iso-butylated melamine; partially n-butylated urea; partially iso-butylated urea; glycoluril; highly alkylated mixed ether melamine-formaldehyde; highly alkylated mixed ether carboxylated melamine resin; hexabutoxy methyl melamine; butoxy methyl melamine; highly alkylated mixed ether melamine; methoxymethyl methylol melamine, highly methylated melamine resins; melamine-formaldehyde resin co-etherified with methanol and n-butoxy ethanol/n-butanol blend; melamine-formaldehyde resin co-etherified with methanol and n-butanol in n-butanol; butylated melamine-formaldehyde resin dissolved in a blend of n-butanol and butyl glycol; hexabutoxy methyl melamine; partially n-butylated melamine; high solids, highly methylated melamine resins; various resinous aldehyde compositions sold under the tradenames CYMEL available from Cytec Industries of West Paterson, N.J., wherein such compositions include, for example, CYMEL 301, CYMEL 303 LF, CYMEL 350, CYMEL 3745, CYMEL MM-100, CYMEL 370, CYMEL 373, CYMEL 3749, CYMEL 323, CYMEL 325, CYMEL 327, CYMEL 328, CYMEL 385, CYMEL 481, CYMEL 1116, CYMEL 1130, CYMEL 1133, CYMEL 1135, CYMEL 1161, CYMEL 1168, CYMEL 1125, CYMEL 1141, CYMEL 202, CYMEL 203, CYMEL 254, CYMEL 1156, CYMEL 1158, CYMEL 9370, CYMEL MB-98, CYMEL MB-11-B, CYMEL MB-14-B, CYMEL 615, CYMEL 651, CYMEL 683, CYMEL 688, CYMEL MI-12-I, CYMEL MI-97-IX, CYMEL UM-15, CYMEL U-80, CYMEL UB-24-BX, CYMEL UB-25-BE, CYMEL UB-26-BX, CYMEL UB-30-B, CYMEL UB-90-BX, CYMEL U-227-8, CYMEL U-610, CYMEL U-640, CYMEL U-646, CYMEL U-662, CYMEL U-663, CYMEL U-665, CYMEL UI-19-I, CYMEL UI-19-IE, CYMEL UI-20-E, CYMEL UI-38-I, CYMEL 1123, CYMEL 659, CYMEL 1172, CYMEL 1170, and the like; and various resinous aldehyde compositions sold under the tradename LUWIPAL and available from the BASF AG of Ludwigshafen, Germany, wherein such compositions include, for example, LUWIPAL LR 8955, LUWIPAL LR 8968, and LUWIPAL LR 8984. Such resins are also available from Ineos Melamines Inc., and sold under the tradenames RESIMENE (e.g., RES-IMENE HM 2608), MAPRENAL, and MADURIT. Various combinations of resinous aldehyde compositions can be used if desired.

In many preferred embodiments, a melamine-formaldehyde resin (sometimes referred to herein as simply a "melamine composition" or "melamine resin") is used. Reference to melamine-formaldehyde resins means a melamine-based resin that has two or more (at least two) alkoxy functional groups (methoxy, ethoxy, propoxy, butoxy, etc.) per melamine molecule. Besides the alkoxy functional groups, the melamine-formaldehyde resins may have hydroxyl or carboxylic acid functional groups.

(II) Hydroxyl-Functional Reactive Additives

Hydroxyl-functional reactive additives can include Bisphenol A, Bisphenol AF, 4,4(1,4-phenylenediisopropylidene) bisphenol; (PDPBPA), 4,4'(1-phenylethlyidene) bisphenol; (PEDBPA), hydroxyl group containing antioxidants that are commonly used in polymer processing such as hindered aromatic phenols, those available under the tradenames HOSTANOX O3 (from Clariant), IRGANOX, etc., fluorinated diols such as POLYFOX reactive polymer intermediates (e.g., PF-636, PF-6320, PF-656, PF-6520, PF-151N, PF-154N, PF-159, PF-7002, etc. from Omnova Chemicals), hydroxyl containing compounds available under the tradenames FOMBLIN PFPE FUNCTIONAL and FLUOROLINK from Solvay, aliphatic polycarbonate diols (e.g., that available under the tradename M112 from Perstop), phenoxy resins, phenolic resins, novolac resins, resorcinol, and polyols. If a polyol is used, such polyol preferably includes at least 2 hydroxyl groups, and often up to 20 hydroxyl groups, per every molecule of polyol.

Hydroxyl-functional reactive additives can include hydroxyl-functional unsaturated monomers. Examples include (meth)acrylated pentaerythritol derivatives, (meth)acrylated glycerol, (meth)acrylated trimethylol propane, (meth)acrylated DGEBA, unsaturated polyesters, hydroxyethyl methacrylate, hydroxy alkyl (meth)acrylate, allyl alcohol propoxylate, allyl ethers and esters of polyhydric alcohols such as allyl ethers of trimethylol propane (e.g., 1,1,1-trimethylolpropane) or pentaerythritol or glycerol, erthitol, threitol, dipentaerythritol, sorbitol, etc.

Hydroxyl-functional reactive additives can include cycloaliphatic polyols such as cyclohexane diemethanol (e.g., the diol UNOXOL available from Dow) or ethoxylates thereof, ethoxylated or propoxylated polyhydric alcohols (e.g., those available under the tradename BOLTRON polyols and ethoxylated pentaerythritol from Perstrop). They can include heterocyclic-based polyols. They can include copolymers of unsaturated aromatic monomers, such as styrene, and hydroxyl-containing unsaturated monomers, such as styrene-allyl alcohol copolymers available under the tradename SAA from Lyondell Corp.

Hydroxyl-functional reactive additives can include polymers containing hydroxyl groups such as polyvinyl alcohol, polymers and copolymers containing hydroxyl groups such as ethylene vinyl alcohol, polyvinyl butyral, and cellulose acetate, cellulose acetate butyrate, cellulose acetate propionate, etc.

(III) Acid-Functional Reactive Additives

Acid-functional reactive additives can include diacids, triacids, etc. Typically, they are carboxylic acids. Carboxylic acid-containing molecules (both hydrocarbon-based and halogen-based) can be used, such as glutaric acid, succinic acid, adipic acid, malonic acid, pimelic acid, suberic acid, azelaic acid, sebacic acid, undecanedioic acid, dodecanedioic acid, phthalic acid, terephthalic acid, isophthalic acid, maleic acid, fumaric acid, glutaconic acid, traumatic acid, muconic acid, citric acid, ascorbic acid, dimethylolpropionic acid, fluorinated acids such as acid-containing compounds such as those available under the tradenames FOMBLIN PFPE FUNCTIONAL and FLUOROLINK from Solvay, polycarboxylic acids such as polyacrylic acids, styrene acrylic acid, polymethacrylic acid, styrene methacrylic acid, etc. Acid-functional reactive additives may also include acyl halides, such as adipoyl chloride.

Acid-functional reactive additives can include weakly acidic oligomers or polymers. Examples include (meth) acrylic acid (i.e., acrylic acid or methacrylic acid) copolymers with other unsaturated monomers such as styrene, maleic acid or anhydride copolymer with other unsaturated monomers such as styrene (e.g., styrene-maleic anhydride copolymer), graft polymers wherein the graft group is a carboxylic acid or anhydride thereof, polymers that include phosphoric acid and esters thereof (e.g., the additive available under the tradename ADDITOL XL-180 from Solutia), and unsaturated polycarboxylic resins characterized by dual functionality (e.g., that available under the tradename SARBOX SB500E 50 from Sartomer).

(IV) Glycidyl Ether-Functional Reactive Additives

Glycidyl ether-functional reactive additives can include diglycidyl ether-containing additives such as trimethylolpropane triglycidyl ether as well as resins sold as epoxy resins or low molecular weight reactive epoxy resins or diluents. Representative examples include epoxy resins, modified epoxy resins, brominated epoxy resins, epoxy reactive diluents sold under the tradename D.E.R (e.g., D.E.R. 317, 321, 322, 325, 331, 331-EL, 530-A80, 337-X80, 732, etc.) by Dow Chemicals. These include Bisphenol A diglycidyl ether, Bisphenol A/F diglycidyl ether, Bisphenol F diglycidyl ether, and modified Bisphenol A diglycidyl ether, Bisphenol A/F diglycidyl ether, Bisphenol F diglycidyl ether. etc. Other examples include epoxy novolac resins sold under the tradename D.E.N. (e.g., D.E.N. 425, 431, 438-A85, etc.) by Dow Chemicals and epoxy resins such as that sold by Momentive. These include epoxy resins, and epoxy multi-functional resins, epoxy novolac resins, and epoxy polyacrylate resins sold under the tradename EPON (e.g., EPON resin 825, 828, 896, 872-X-75, 1001-X-75, etc.), epoxy functional modifiers sold under the tradename HELOXY (e.g., HELOXY Modifier 8, 61, 48, 67, 68, etc.), and cycloaliphatic epoxy resin sold under the tradename EPONEX (e.g., EPONEX Resin 1510).

(V) Isocyanate-Functional Reactive Additives

Isocyanate-functional reactive additives can include aliphatic and aromatic polyisocyanates (e.g., triphenylmethane triisocyanate), preferably aromatic and aliphatic blocked polyisocyanates, such as those sold by Bayer (under the registered name DESMODUR BL (e.g., BL 1100/1, BL 1265 MPA/X, BL 3175 SN, BL 4265 SN, BL 5375, PL 350, PL 340, VP LS 2078/2, etc.), BAYHYDUR BL (e.g., BL 5140, BL 5335, VP LS 2310, BL XP 2706, etc.), EVONIK, and VESTANAT (e.g., VESTANAT EP-B 1042 E, VESTANAT 1358 A, VESTANAT 1370, VESTANAT EP-DS 1205, VESTANAT EP-DS 1076, and VESTANAT BF 1320).

(VI) Amine-Functional Reactive Additives

Amine-functional reactive additives can include polyethyleneimine, chitosan, lysine, polylysine, amino acids, and amines including phenylene diamine (para, ortho, meta), dimethyl 4-phenylene diamine, trietylenetetramine, trimethylol propane tris(poly(propylene glycol) amine terminated) ether. Amine-functional reactive additives can also include reactive additives can include aliphatic and aromatic polyurethanes, fluorinated polyurethanes (prepolymers, oligomeric and polymeric).

(VII) Dichloro-Functional Reactive Additives

An example of a dichloro-functional reactive additive is dichlorodiphenyl sulfone.

In certain embodiments, at least one reactive additive is a resinous aldehyde composition that includes reactive alkoxy groups (Group I) and at least one reactive additive includes alkoxy-reactive groups (i.e., groups reactive with alkoxy groups, such as hydroxyl groups (Group II), acid groups (Group III), diglycidyl ether groups (Group IV), or isocyanate groups (Group V)).

In certain embodiments, the molar ratio of reactive groups in one reactive additive to reactive groups in another reactive additive is greater than 0.1:100. For example, in certain embodiments, the molar ratio of alkoxy-reactive groups to alkoxy groups is greater than 0.1:100.

In certain embodiments the reactive additive is a surface-migrating agent. In certain embodiments, the surface-migrating agent is also a crosslinking agent, such that at least a portion of at least one fiber-forming polymer is crosslinked by the surface-migrating crosslinking agent. An exemplary surface-migrating crosslinking agent is a resinous aldehyde composition.

In certain embodiments, the reactive additive is not reactive with the fiber-forming polymer but is self-condensing. This could form a crosslinked network.

In certain embodiments, combinations of reactive additives can be used. For example, one reactive additive can be used that crosslinks with the fiber-forming polymer, and a different reactive additive can be used that self-condenses.

In certain embodiments, one or more reactive additives are selected to "enhance" one or more properties of the fibers compared to the fibers without the reactive additive(s). This means that one or more reactive additives are selected to simply enhance one or more properties the fibers already possessed compared to the fibers without the reactive additive(s). This also means that one or more reactive additives are selected to provide the resultant fine fibers with one or more properties such fibers would not possess without the reactive additive(s).

Such properties may be surface properties of each fiber and/or such properties may be bulk properties of each fiber. Such properties may be mechanical and/or chemical properties.

Examples of such properties include hydrophobicity, hydrophilicity, oleophobicity, oleophilicity, thermal stability, chemical stability, inter-fiber adhesion, adhesion for a substrate, antistatic, conductivity, stain resistance, water and/or oleo resistance, vibration damping, acoustic damping, and combinations thereof.

Fiber-Forming Polymers

The fiber-forming polymers may be reactive or nonreactive with the reactive additives.

In this context, "reactive" means that the polymer includes one or more functional groups capable of reacting with one or more functional groups of one or more reactive additives. For example, a fiber-forming polymer may include functional groups capable of being crosslinked by the alkoxy groups of a resinous aldehyde composition used as one of the reactive additives in making the fine fibers.

In this context, "nonreactive" is defined as being unable to react with one or more of the reactive additives.

Thus, whether a polymer is considered reactive or nonreactive depends on the selection of the reactive additives. That is, certain polymers may be classified as a reactive polymer in one reaction mixture but as a nonreactive polymer in a different reactive mixture.

In certain embodiments, suitable reactive fiber-forming polymers include one or more active hydrogen groups capable of reacting with one or more reactive additives. For example, a reactive fiber-forming polymer can be cross-linked by a resinous aldehyde composition. Preferred such polymer materials include one or more active hydrogen groups which include, but are not limited to, thiol (—SH), hydroxyl (—OH), carboxylate (—CO$_2$H), amido (—C(O)—NH— or —C(O)—NH$_2$), amino (—NH$_2$), epoxide (or glycidyl ether groups) or imino (—NH—), and anhydride (—COO)$_2$R groups (upon hydrolysis). These groups can be found in pendent polymer groups or in the polymer backbone.

Fine fiber-forming polymer materials suitable for use in making the fine fibers of the present disclosure include both addition polymer and condensation polymer materials with active hydrogens. Suitable examples include poly(meth)acrylic acids, polyamides, cellulose ethers and esters, poly(maleic anhydride) copolymers, polyamines such as chitosan and mixtures, blends, alloys, and block, graft, or random copolymers thereof. Such copolymers can include one or more other moieties in addition to those listed in the previous sentence. Preferred materials that fall within these generic classes include poly(vinyl alcohol) in various degrees of hydrolysis (e.g., 87% to 99.5%). Preferred addition polymers tend to be glassy, that is, having a $T_g$ (glass transition temperature) greater than room temperature. Additionally, polymer materials that have low crystallinity, such as poly(vinyl alcohol) materials, are also useful as the polymer materials of the disclosure.

Other preferred examples of useful polymer materials include cellulose derivatives selected from the group consisting of ethyl cellulose, hydroxyl ethyl cellulose, cellulose acetate, cellulose acetate butyrate, cellulose acetate propionate, cellulose acetate phthalate, and mixtures thereof poly(meth)acrylic acid homopolymers and copolymers, including for example, styrene-(meth)acrylic acid copolymers and ethylene-(meth)acrylic acid copolymers; polyvinyl alcohol homopolymers or copolymers, including for example, a polyvinyl butyral and an ethylene co-vinyl alcohol copolymer; poly(maleic anhydride) copolymers, including for example, a styrene-maleic anhydride copolymer; and polyurethanes. Herein, a poly(meth)acrylic acid refers to poly(acrylic acid) and poly(methacrylic acid) polymers.

Many types of polyamides are also useful as the polymer materials in the fibers of the disclosure. One useful class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of 8-caprolactam in the presence of a small amount of water. This reaction forms a nylon-6 (made from a cyclic lactam, also known as 8-aminocaproic acid) that is a linear polyamide. Further, nylon copolymers are also contemplated. Exemplary nylon materials include nylon-6, nylon-6,6, nylon-6,10, mixtures or copolymers thereof.

Copolymers can be made by combining various diamine compounds, various diacid compounds and various cyclic lactam structures in a reaction mixture and then forming the nylon with randomly positioned monomeric materials in a polyamide structure. For example, a nylon-6,6-6,10 material is a nylon manufactured from hexamethylene diamine and a $C_6$ and a $C_{10}$ blend of diacids. A nylon-6-6,6-6,10 is a nylon manufactured by copolymerization of 8-aminocaproic acid, hexamethylene diamine and a blend of a $C_6$ and a $C_{10}$ diacid material. Herein, the term "copolymer" includes polymers made from two or more different monomers and include terpolymers, etc.

Block copolymers are also useful as the fiber-forming polymer materials in the fibers of the disclosure. With such copolymers, where fibers will be electrospun, the choice of solvent or solvent blend is important. The selected solvent or solvent blend is selected such that both blocks are soluble in the solvent. Examples of useful block copolymers include PEBAX ε-caprolactam-b-ethylene oxide, available from Arkema Inc. of Philadelphia, Pa.; and polyurethanes of ethylene oxide and isocyanates.

Addition polymers like polyvinyl alcohol, and amorphous addition polymers such as poly(acrylonitrile) copolymers with acrylic acid are also useful. They can be solution spun with relative ease because they are soluble or dispersible in a variety of solvents and solvent blends at low pressures and temperatures. A poly(vinyl alcohol) having a hydrolysis degree of, for example, from 87 to 99.9+% can be used as the polymer material in the fibers of the disclosure.

Preferred polymers within this embodiment include polyamides (particularly nylon), polyester amides, a polyvinyl alcohol, an ethylene-co-vinyl alcohol polymer, a polyvinyl butyral, and poly(maleic anhydride) copolymers. Preferred active hydrogen groups include hydroxyl, amino, and amido groups. Various combinations of polymer materials can be used if desired.

Other fiber-forming polymer materials used in the fibers of the disclosure can be nonreactive with certain reactive additives (e.g., resinous aldehyde compositions), but they may be reactive with others. For example, polymer materials such as many polyolefins, polyvinyl chloride and other such materials may be used, wherein such polymers have no groups that can crosslink with the resinous aldehyde composition. Other such polymers include polyacetals, polyesters, polyalkylene sulfides, polyarylene oxides, polysulfones, modified (e.g., polyether) polysulfone polymers, poly(vinylpyridine) such as poly(4-vinylpyridine), and the like. Preferred materials that fall within these generic classes include polyethylene, polypropylene, poly(vinyl chloride), poly(methylmethacrylate), (and other acrylic resins), polystyrene, and copolymers thereof (including ABA type block copolymers), poly(vinylidene fluoride), poly(vinylidene chloride), mixtures, blends, or alloys. Examples of useful block copolymers include ABA-type copolymers (e.g, styrene-EP-styrene) (wherein "EP" refers to ethylene-propylene) or AB (e.g., styrene-EP) polymers, KRATON styrene-b-butadiene and styrene-b-hydrogenated butadiene(ethylene propylene), available from Kraton Polymers U.S. LLC of Houston, Tex.; and SYMPATEX polyester-b-ethylene oxide, available from SympaTex Technologies Inc. of Hampton, N.H. Various combinations of nonreactive polymers can be used if desired.

Polymers like poly(vinylidene fluoride), syndiotactic polystyrene, copolymers of vinylidene fluoride and hexafluoropropylene, polyvinyl acetate, amorphous addition polymers such as polystyrene, poly(vinyl chloride) and its various copolymers, and poly(methyl methacrylate) and its various copolymers can be solution spun with relative ease because they are soluble or dispersible in a variety of solvents and solvent blends at low pressures and temperatures.

Formation of Fine Fibers

Fine fibers of the present disclosure can be prepared using a method that includes: providing at least one fiber-forming polymer; providing at least two reactive additives reactive with each other, and optionally reactive with the fiber-forming polymer; and combining the at least one fiber-forming polymer and the at least two reactive additives under conditions effective to form a plurality of fine fibers.

The polymer materials (e.g., single polymer or polymer mixture or blend) are selected such that it can be combined with the reactive additives in a solution or dispersion or in the melt. In certain embodiments, the fine fibers are electrospun from a solution or dispersion or spun using centrifugal force. Thus, in certain embodiments, the polymer materials and reactive additives are dispersible or soluble in at least one common solvent or solvent blend suitable for electrospinning They should be substantially stable in the melt or in solution or dispersion form for sufficient time such that the fiber can be formed.

The amount of reactive additives used can be readily determined by one of skill in the art to obtain the desired result. Typically, the amount of reactive additives relative to each other is determined by the stoichiometry of the reactive functionality, such that a desired number of covalent bonds are formed. Typically, the amount of reactive additive relative(s) to the fiber-forming polymer(s) is at least 0.5:100, or at least 1:100 or at least 5:100, or at least 10:100, or at least 20:100 (weight ratio). Typically, the amount of reactive additive relative(s) to the fiber-forming polymer(s) is up to 50:100, or up to 200:100 (weight ratio), or even higher.

In certain embodiments, the amount of reactive additive is such that the molar ratio of hydroxyl (or carboxylic acid groups or any other functional groups capable of reacting with alkoxy groups) to the alkoxy group of a resinous aldehyde composition is greater than 10:100 (more preferably, greater than 1:100, and even more preferably, greater than 5:100). Preferably, the molar ratio of the reactive additive to the resinous aldehyde composition is such that the molar ratio of the reactive functional groups (hydroxyl or carboxylic acid groups or any other functional groups capable of reacting with the alkoxy groups) to the alkoxy groups in the resinous aldehyde composition is up to 200:100 (more preferably, up to 150:100, and even more preferably, up to 100:100).

In certain embodiments, the amount of resinous aldehyde composition is such that the molar ratio of alkoxy groups of the resinous aldehyde composition to active hydrogen groups of the fiber-forming polymer is greater than 10:100 (preferably, greater than 20:100, more preferably, greater than 30:100, and even more preferably, greater than 40:100). Preferably, the molar ratio of resinous aldehyde composition to the fiber-forming polymer is such that the molar ratio of alkoxy groups in the resinous aldehyde composition to active hydrogen groups in the fiber-forming polymer is up to 300:100 (more preferably, up to 250:100, and even more preferably, up to 210:100).

In certain embodiments, using a weight ratio of the reactive additive composition to the resinous aldehyde composition of greater than 20:100 (20 parts by weight resinous aldehyde composition per 100 parts by weight of the polymer) results in a useful exterior phase that may or may not include the resinous aldehyde composition surrounding the core polymer that may include the resinous aldehyde composition and the reactive additive as the minor phase.

Thus, in certain embodiments, each fine fiber can include a core phase and a coating phase, wherein the core phase includes a fiber-forming polymer and the coating phase includes at least two reactive additives covalently bonded to each other. In embodiments where the polymer has an active hydrogen group, and where a resinous aldehyde composition is selected as one of the reactive additives, some proportion of the resinous aldehyde crosslinks adjacent polymer chains residing in the core polymer phase. In other words, some proportion of the resinous aldehyde composition causes some degree of crosslinking of available active hydrogen moieties (i.e., groups) that are pendent groups or groups in the polymer backbone present in the internal core polymer phase. In addition, some proportion of the resinous aldehyde composition can react with the monofunctional or difunctional second component. With the use of appropriate ratios of polymer material and resinous aldehyde composition and the second component in the fiber formation, in some embodiments, the resinous aldehyde composition together with the second component can also form an additional outer coating phase surrounding the core crosslinked polymer phase.

In certain embodiments, each fine fiber can include a core phase, a coating phase, and a transition phase.

In certain of such three-phase fibers, the core phase predominantly includes the fiber-forming polymer, the coating phase predominantly includes the at least two reactive additives covalently bonded to each other, and the transition phase includes the fiber-forming polymer and at least two reactive additives covalently bonded to each other.

In this context, "predominantly" means the referenced material is present in a particular region (e.g., coating, layer, or phase) in a major amount (i.e., greater than 50% by weight) of the material in that region.

In other of such three-phase fibers, the core phase predominantly includes the fiber-forming polymer, the transition phase includes at least two reactive additives covalently bonded to each other, and the coating phase predominantly includes a surface-migrating agent.

In still other of such three-phase fibers, the core phase predominantly includes the fiber-forming polymer covalently bonded with at least one of the reactive additives, the transition phase includes at least two reactive additives covalently bonded to each other, and the coating phase predominantly includes a surface-migrating agent.

In other embodiments, a mixture or blend of nonreactive polymer material (not capable of reacting or crosslinking with the reactive additive composition), resinous aldehyde composition, and a second reactive additive composition forms a uniform (i.e., homogeneous) mixture (e.g., blend) of the three components in a semi-interpenetrating network morphology.

In certain embodiments, fine fibers of the present disclosure demonstrate at least 20%, or at least 30%, or at least 40%, or at least 50%, fine fiber layer efficiency retained per the Ethanol Soak Test.

Typically, in a method of making the fine fibers of the present disclosure, the components are combined under conditions effective to form covalent bonds between at least two reactive additives, and optionally between at least one of the reactive additives and at least one of the fiber-forming polymers (and optionally, within one reactive additive, thereby resulting it self-condensing). This can occur during the fiber formation process. Alternatively or additionally, in certain embodiments, subsequent to the combining step in which the fibers are initially formed, the method includes subjecting the fine fibers to conditions effective to form covalent bonds between the at least two reactive additives, and optionally between at least one of the reactive additives and at least one of the fiber-forming polymers.

If desired, a crosslinking reaction between a reactive additive (e.g., a resinous aldehyde composition) and a fiber-forming polymer material and between two reactive additives (e.g., between a resinous aldehyde composition and second reactive additive), as described herein, can be enhanced, e.g., with respect to speed and extent, by exposing the fine fibers to thermal treatment (particularly after fiber formation). Such thermal treatment typically includes a temperature of at least 80° C., at least 100° C., or at least 120° C., and typically no greater than 150° C., for typically at least 5 seconds, and typically no greater than 10 minutes.

Fine fibers of the disclosure can be made using a variety of techniques including electrostatic spinning, centrifugal or rotary spinning, wet spinning, dry spinning, melt spinning, extrusion spinning, direct spinning, gel spinning, etc.

The fine fibers are collected on a support layer during, for example, electrostatic or melt spinning formation, and are often heat treated after fiber making Preferably, the layer of fine fiber material is disposed on a first surface of a layer of permeable coarse fibrous media (i.e., support layer) as a layer of fiber. Also, preferably the first layer of fine fiber material disposed on the first surface of the first layer of permeable coarse fibrous material has an overall thickness that is no greater than 50 microns, more preferably no greater than 30 microns, even more preferably no more than 20 microns, and most preferably no greater than 10 microns. Typically and preferably, the thickness of the fine fiber layer is within a thickness of 1-20 times (often 1-8 times, and more preferably no more than 5 times) the fine fiber average diameter used to make the layer. In certain embodiments, the fine fiber layer has a thickness of at least 0.05 μm.

Fine fibers of the disclosure can be made preferably using the electrostatic spinning process. A suitable electrospinning apparatus for forming the fine fibers includes a reservoir in which the fine fiber forming solution is contained, and an emitting device, which generally consists of a rotating portion including a plurality of offset holes. As it rotates in the electrostatic field, a droplet of the solution on the emitting device is accelerated by the electrostatic field toward the collecting media. Facing the emitter, but spaced apart therefrom, is a grid upon which the collecting media (i.e., a substrate or combined substrate) is positioned. Air can be drawn through the grid. A high voltage electrostatic potential is maintained between emitter and grid by means of a suitable electrostatic voltage source. The substrate is positioned in between the emitter and grid to collect the fiber.

Specifically, the electrostatic potential between grid and the emitter imparts a charge to the material which cause liquid to be emitted therefrom as thin fibers which are drawn toward grid where they arrive and are collected on substrate. In the case of the polymer in solution, a portion of the solvent is evaporated off the fibers during their flight to the substrate. The fine fibers bond to the substrate fibers as the solvent continues to evaporate and the fiber cools. Electrostatic field strength is selected to ensure that as the polymer material is accelerated from the emitter to the collecting media, the acceleration is sufficient to render the polymer material into a very thin microfiber or nanofiber structure. Increasing or slowing the advance rate of the collecting media can deposit more or less emitted fibers on the forming media, thereby allowing control of the thickness of each layer deposited thereon.

Alternatively the electrospinning apparatus for forming fine fibers can be a pendant drop apparatus, i.e., syringe filled with polymer solution. A high voltage is applied to the needle attached to the syringe and the polymer solution is pumped at a specified pump rate. As the drop of the polymer solution emerges from the needle, it forms a Taylor cone under the influence of the electrostatic field. At sufficiently high voltages, a jet is emitted from the Taylor cone which undergoes extension and fine fibers are formed and deposited on the media attached to a rotating mandrel which acts as the collector. Electrospinning processes usually use polymer solutions with 5-20% solids (on polymer) concentration. Solvents that are safe and easy to use are desired in industrial applications. On the other hand, fibers formed with such solvents often need to survive and perform in a wide variety of environments.

Filter Media and Filter Elements

Fine fibers of the present disclosure can be formed into a filter structure such as filter media. In such a structure, the fine fiber materials of the disclosure are disposed on (typically, they are formed on and adhered to) a filter substrate (i.e., filtration substrate). Natural fiber and synthetic fiber substrates can be used as the filter substrate. Examples include spunbonded or melt-blown supports or fabrics, wovens and nonwovens of synthetic fibers, cellulosic materials, and glass fibers. Plastic screen-like materials both extruded and hole punched, are other examples of filter substrates, as are ultra-filtration (UF) and micro-filtration (MF) membranes of organic polymers. Examples of synthetic nonwovens include polyester nonwovens, nylon nonwovens, polyolefin (e.g., polypropylene) nonwovens, or blended nonwovens thereof. Sheet-like substrates (e.g., cellulosic and/or synthetic nonwoven webs) are the typical form of the filter substrates. The shape and structure of the filter material, however, is typically selected by the design engineer and depends on the particular filtration application.

A filter media construction according to the present disclosure can include a layer of permeable coarse fibrous material (i.e., media or substrate) having a first surface. A first layer of fine fiber media is preferably disposed on the first surface of the layer of permeable coarse fibrous media.

Preferably, the layer of permeable coarse fibrous material includes fibers having an average diameter of at least 5 microns, and more preferably at least 12 microns, and even more preferably at least 14 microns. Preferably, the coarse fibers have an average diameter of no greater than 50 microns.

Also, preferably, the permeable coarse fibrous material comprises a media having a basis weight of no greater than 260 grams/meter$^2$ (g/m$^2$), and more preferably no greater than 150 g/m$^2$. Preferably, the permeable coarse fibrous material comprises a media having a basis weight of at least 0.5 g/m$^2$, and more preferably at least 8 g/m$^2$. Preferably, the first layer of permeable coarse fibrous media is at least 0.0005 inch (12 microns) thick, and more preferably at least 0.001 inch thick. Preferably, the first layer of permeable coarse fibrous media is no greater than 0.030 inch thick. Typically and preferably, the first layer of permeable coarse fibrous media is 0.001 inch to 0.030 inch (25-800 microns) thick. Preferably, the first layer of permeable coarse fibrous media has a Frazier permeability (differential pressure set at 0.5 inch of water) of at least 2 meters/minute (m/min). Preferably, the first layer of permeable coarse fibrous media has a Frazier permeability (differential pressure set at 0.5 inch of water) of no greater than 900 m/min.

In preferred arrangements, the first layer of permeable coarse fibrous material comprises a material which, if evaluated separately from a remainder of the construction by the Frazier permeability test, would exhibit a permeability of at least 1 m/min, and preferably at least 2 m/min. In preferred arrangements, the first layer of permeable coarse fibrous material comprises a material which, if evaluated separately from a remainder of the construction by the Frazier permeability test, would exhibit a permeability of no greater than 900 m/min, and typically and preferably 2-900 m/min. Herein, when reference is made to efficiency or LEFS efficiency ((Low Efficiency Flat Sheet), unless otherwise specified, reference is meant to efficiency when measured according to ASTM-1215-89, with 0.78 micron (μ) monodisperse polystyrene spherical particles, at 20 fpm (feet per minute, 6.1 m/min) as described herein.

In these embodiments, a layer of fine fiber can be manufactured by forming a plurality of fine fibers on a filtration substrate, thereby forming a filter media. The filter media (i.e., fine fiber layer plus filtration substrate) can then be manufactured into filter elements (i.e., filtration elements), including, e.g., flat-panel filters, cartridge filters, or other filtration components. Examples of such filter elements are described in U.S. Pat. Nos. 6,746,517; 6,673,136; 6,800,117; 6,875,256; 6,716,274; and 7,316,723. The shape and structure of the filter material, however, is typically selected by the design engineer and depends on the particular filtration application Exemplary Method Embodiments 1. A method of making fine fibers, the method comprising:
providing at least one fiber-forming polymer;
providing at least two reactive additives reactive with each other, and optionally reactive with the fiber-forming polymer; and
combining the at least one fiber-forming polymer and the at least two reactive additives under conditions effective to form a plurality of fine fibers;
with the proviso that:
at least one of the reactive additives is not a resinous aldehyde composition; and
if at least one of the fiber-forming polymers is a polyamide, then none of the reactive additives is a polyamide.

2. A method of making fine fibers, the method comprising:
providing at least one fiber-forming polymer;
providing at least two reactive additives reactive with each other, and optionally reactive with the fiber-forming polymer; and
combining the at least one fiber-forming polymer and the at least two reactive additives under conditions effective to form a plurality of fine fibers;
with the proviso that:
at least one of the reactive additives is not a resinous aldehyde composition; and
at least one of the reactive additives has a weight average molecular weight of less than 3000 Daltons.

3. The method of embodiment 1 or 2 wherein at least one of the reactive additives is a surface-migrating agent.

4. The method of embodiment 3 wherein the surface-migrating agent is also a crosslinking agent.

5. The method of embodiment 4 wherein at least a portion of at least one fiber-forming polymer is crosslinked by the surface-migrating crosslinking agent.

6. The method of embodiment 5 wherein the surface-migrating crosslinking agent is a resinous aldehyde composition.

7. The method of any of embodiments 1 through 6 wherein at least one of the reactive additives is self-condensing.

8. The method of any of embodiments 1 through 7 wherein the combining step comprises forming covalent bonds between the at least two reactive additives and optionally between at least one of the reactive additives and at least one of the fiber-forming polymers.

9. The method of any of embodiments 1 through 8 wherein subsequent to the combining step, the method comprises subjecting the fine fibers to conditions effective to form covalent bonds between the at least two reactive additives and optionally between at least one of the reactive additives and at least one of the fiber-forming polymers.

10. The method of any of embodiments 1 through 9 wherein at least one of the reactive additives enhances at least one property of the fine fibers compared to the fine fibers without such reactive additive.

11. The method of embodiment 10 wherein the at least one property is a surface property of each fiber.

12. The method of embodiment 10 wherein the at least one property is a bulk property of each fiber.

13. The method of any of embodiments 10 through 12 wherein the at least one property is a mechanical and/or chemical property.

14. The method of any of embodiments 10 through 13 wherein the at least one property is selected from hydrophobicity, hydrophilicity, oleophobicity, oleophilicity, thermal stability, chemical stability, inter-fiber adhesion, adhesion for a substrate, antistatic, conductivity, stain resistance, water and/or oleo resistance, vibration damping, acoustic damping, and combinations thereof.

15. The method of any of embodiments 1 through 14 wherein at least one fiber-forming polymer comprises a polyamide.

16. The method of embodiment 15 wherein the polyamide comprises a nylon.

17. The method of embodiment 16 wherein the nylon comprises nylon-6, nylon-6,6, nylon-6,10, mixtures or copolymers thereof.

18. The method of embodiment 17 wherein the nylon comprises nylon-6-6,6-6,10.

19. The method of any of embodiments 1 through 18 wherein at least one fiber-forming polymer comprises a polyvinyl butyral, an ethylene co-vinyl alcohol co-polymer, or a mixture thereof.

20. The method of any of embodiments 1 through 19 wherein at least one fiber-forming polymer comprises a cellulose derivative selected from the group consisting of ethyl cellulose, hydroxyl ethyl cellulose, cellulose acetate, cellulose acetate butyrate, cellulose acetate propionate, cellulose acetate phthalate, and mixtures thereof.

21. The method of any of embodiments 1 through 20 wherein at least one fiber-forming polymer comprises a poly(meth)acrylic acid homopolymer or copolymer.

22. The method of embodiment 21 wherein at least one fiber-forming polymer comprises a styrene-(meth)acrylic acid copolymer.

23. The method of any of embodiments 1 through 22 wherein at least one fiber-forming polymer comprises a poly(maleic anhydride) copolymer.

24. The method of embodiment 23 wherein at least one fiber-forming polymer comprises a styrene-maleic anhydride copolymer.

25. The method of any of embodiments 1 through 24 wherein at least one of the reactive additives has a weight average molecular weight of less than 3000 Daltons.

26. The method of embodiment 25 wherein all of the reactive additives have a weight average molecular weight of less than 3000 Daltons.

27. The method of any of embodiments 1 through 26 wherein at least one of the reactive additives comprises a hydroxyl-functional component.

28. The method of embodiment 27 wherein the hydroxyl-functional component comprises a diol, a triol, a polyol, or a mixture thereof.

29. The method of embodiment 1 through 28 wherein at least one of the reactive additives comprises a carboxylic acid-functional component.

30. The method of embodiment 29 wherein the carboxylic acid-functional component comprises a compound with multiple carboxylic acid groups.

31. The method of any of embodiments 1 through 30 wherein at least one of the reactive additives comprises a glycidyl ether-functional component.

32. The method of embodiment 31 wherein the glycidyl ether-functional component comprises a compound with multiple glycidyl ether groups.

33. The method of any one of embodiments 1 through 32 wherein at least one of the reactive additives comprises an amine-functional component.

34. The method of embodiment 33 wherein the amine functional component comprises a primary amine compound, a secondary amine compound, a tertiary amine compound, or a mixture thereof.

35. The method of embodiment 34 wherein the amine-functional component comprises a compound with multiple primary, secondary, or tertiary amine groups.

36. The method of any of embodiments 1 through 35 wherein at least one reactive additive comprises an isocyanate-functional component.

37. The method of embodiment 36 wherein the isocyanate-functional component comprises a compound with multiple isocyanate groups.

38. The method of any of embodiments 1 through 37 wherein at least one reactive additive comprises dichlorodiphenyl sulfone.

39. The method of any of embodiments 1 through 38 wherein each fine fiber comprises a core phase and a coating phase, wherein the core phase comprises a fiber-forming polymer and the coating phase comprises the at least two reactive additives covalently bonded to each other.

40. The method of any of embodiments 1 through 39 wherein each fine fiber comprises a core phase, a coating phase, and a transition phase.

41. The method of embodiment 40 wherein the core phase predominantly comprises the fiber-forming polymer, the coating phase comprises the at least two reactive additives covalently bonded to each other, and the transition phase comprises the fiber-forming polymer and the at least two reactive additives covalently bonded to each other.

42. The method of embodiment 40 wherein the core phase predominantly comprises the fiber-forming polymer, the transition phase comprises the at least two reactive additives covalently bonded to each other, and the coating phase comprises a surface-migrating agent.

43. The method of embodiment 42 wherein the core phase predominantly comprises the fiber-forming polymer covalently bonded with at least one of the reactive additives, the transition phase comprises the at least two reactive additives covalently bonded to each other, and the coating phase comprises a surface-migrating agent.

44. The method of any of embodiments 1 through 43 wherein at least one reactive additive is a resinous aldehyde composition comprising reactive alkoxy groups and at least one reactive additive comprises alkoxy-reactive groups, wherein the molar ratio of alkoxy-reactive groups to the alkoxy groups is greater than 0.1:100.

45. The method of any of embodiments 1 through 44 wherein at least one fiber-forming polymer is a nonreactive polymer.

Exemplary Product-by-Process Embodiments

1. A fine fiber prepared by a method comprising:
   providing at least one fiber-forming polymer;
   providing at least two reactive additives reactive with each other, wherein at least one of the reactive additives is reactive with the at least one fiber-forming polymer; and
   combining the at least one fiber-forming polymer and the at least two reactive additives to form a plurality of fine fibers;
   with the proviso that:
      at least one of the reactive additives is not a resinous aldehyde composition; and
      if the fiber-forming polymer is a polyamide, then none of the reactive additives is a polyamide.

2. A fine fiber prepared by a method comprising:
   providing at least one fiber-forming polymer;
   providing at least two reactive additives reactive with each other, wherein at least one of the reactive additives is reactive with the at least one fiber-forming polymer; and
   combining the at least one fiber-forming polymer and the at least two reactive additives to form a plurality of fine fibers;
   with the proviso that:
      at least one of the reactive additives is not a resinous aldehyde composition; and
      at least one of the reactive additives has a weight average molecular weight of less than 3000 Daltons.

3. A fine fiber prepared by a method comprising:
   providing at least one fiber-forming polymer;
   providing at least two reactive additives reactive with each other, and not reactive with the at least one fiber-forming polymer; and
   combining the at least one fiber-forming polymer and the at least two reactive additives to form a plurality of fine fibers;
   with the proviso that:
      at least one of the reactive additives is not a resinous aldehyde composition;
      at least one of the reactive additives is tri-functional or higher; and
      if at least one of the fiber-forming polymers is a polyamide, then none of the reactive additives is a polyamide.

4. A fine fiber prepared by a method comprising:
   providing at least one fiber-forming polymer;
   providing at least two reactive additives reactive with each other, and not reactive with the at least one fiber-forming polymer; and
   combining the at least one fiber-forming polymer and the at least two reactive additives to form a plurality of fine fibers;
   with the proviso that:
      at least one of the reactive additives is not a resinous aldehyde composition;
      at least one of the reactive additives is tri-functional or higher; and
      at least one of the reactive additives has a weight average molecular weight of less than 3000 Daltons.

5. The fine fiber of any of embodiments 1 through 4 wherein at least one of the reactive additives is a surface-migrating agent.

6. The fine fiber of embodiment 5 wherein the surface-migrating agent is also a crosslinking agent.

7. The fine fiber of embodiment 6 wherein at least a portion of at least one fiber-forming polymer is crosslinked by the surface-migrating crosslinking agent.

8. The fine fiber of embodiment 7 wherein the surface-migrating crosslinking agent is a resinous aldehyde composition.

9. The fine fiber of any of embodiments 1 through 8 wherein at least one of the reactive additives self-condenses during the combining step or subsequent thereto.

10. The fine fiber of any of embodiments 1 through 9 wherein the combining step comprises forming covalent bonds between the at least two reactive additives and optionally between at least one of the reactive additives and at least one of the fiber-forming polymers.

11. The fine fiber of any of embodiments 1 through 10 wherein subsequent to the combining step, the method comprises subjecting the fine fibers to conditions effective to form covalent bonds between the at least two reactive additives and optionally between at least one of the reactive additives and at least one of the fiber-forming polymers.

12. The fine fiber of any of embodiments 1 through 11 wherein at least one of the reactive additives enhances at least one property of the fine fibers compared to the fine fibers without such reactive additive.

13. The fine fiber of embodiment 12 wherein the at least one property is a surface property of each fiber.

14. The fine fiber of embodiment 12 wherein the at least one property is a bulk property of each fiber.

15. The fine fiber of any of embodiments 12 through 14 wherein the at least one property is a mechanical and/or chemical property.

16. The fine fiber of any of embodiments 12 through 15 wherein the at least one property is selected from hydrophobicity, hydrophilicity, oleophobicity, oleophilicity, thermal stability, chemical stability, inter-fiber adhesion, adhesion for a substrate, antistatic, conductivity, stain resistance, water and/or oleo resistance, vibration damping, acoustic damping, and combinations thereof.

17. The fine fiber of any of embodiments 1 through 16 wherein at least one fiber-forming polymer comprises a polyamide.

18. The fine fiber of embodiment 17 wherein the polyamide comprises a nylon.

19. The fine fiber of embodiment 18 wherein the nylon comprises nylon-6, nylon-6,6, nylon-6,10, mixtures or copolymers thereof.

20. The fine fiber of embodiment 19 wherein the nylon comprises nylon-6-6,6-6,10.

21. The fine fiber of any of embodiments 1 through 20 wherein at least one fiber-forming polymer comprises a polyvinyl butyral, an ethylene co-vinyl alcohol co-polymer, or a mixture thereof.

22. The fine fiber of any of embodiments 1 through 21 wherein at least one fiber-forming polymer comprises a cellulose derivative selected from the group consisting of ethyl cellulose, hydroxyl ethyl cellulose, cellulose acetate, cellulose acetate butyrate, cellulose acetate propionate, cellulose acetate phthalate, and mixtures thereof.

23. The fine fiber of any of embodiments 1 through 22 wherein at least one fiber-forming polymer comprises a poly(meth)acrylic acid homopolymer or copolymer.

24. The fine fiber of embodiment 23 wherein at least one fiber-forming polymer comprises a styrene-(meth)acrylic acid copolymer.

25. The fine fiber of any of embodiments 1 through 24 wherein at least one fiber-forming polymer comprises a poly(maleic anhydride) copolymer.

26. The fine fiber of embodiment 25 wherein at least one fiber-forming polymer comprises a styrene-maleic anhydride copolymer.

27. The fine fiber of any of embodiments 1 through 26 wherein at least one of the reactive additives has a weight average molecular weight of less than 3000 Daltons.

28. The fine fiber of embodiment 27 wherein all of the reactive additives have a weight average molecular weight of less than 3000 Daltons.

29. The fine fiber of any of embodiments 1 through 28 wherein at least one of the reactive additives comprises a hydroxyl-functional component.

30. The fine fiber of embodiment 29 wherein the hydroxyl-functional component comprises a diol, a triol, a polyol, or a mixture thereof.

31. The fine fiber of embodiments 1 through 30 wherein at least one of the reactive additives comprises a carboxylic acid-functional component.

32. The fine fiber of embodiment 31 wherein the carboxylic acid-functional component comprises a compound with multiple carboxylic acid groups.

33. The fine fiber of any of embodiments 1 through 32 wherein at least one of the reactive additives comprises a glycidyl ether-functional component.

34. The fine fiber of embodiment 33 wherein the glycidyl ether-functional component comprises a compound with multiple glycidyl ether groups.

35. The fine fiber of any one of embodiments 1 through 34 wherein at least one of the reactive additives comprises an amine-functional component.

36. The fine fiber of embodiment 35 wherein the amine functional component comprises a primary amine compound, a secondary amine compound, a tertiary amine compound, or a mixture thereof.

37. The fine fiber of embodiment 36 wherein the amine-functional component comprises a compound with multiple primary, secondary, or tertiary amine groups.

38. The fine fiber of any of embodiments 1 through 37 wherein at least one reactive additive comprises an isocyanate-functional component.

39. The fine fiber of embodiment 38 wherein the isocyanate-functional component comprises a compound with multiple isocyanate groups.

40. The fine fiber of any of embodiments 1 through 39 wherein at least one reactive additive comprises dichlorodiphenyl sulfone.

41. The fine fiber of any of embodiments 1 through 40 wherein each fine fiber comprises a core phase and a coating phase.

42. The fine fiber of embodiment 41 wherein the core phase comprises a fiber-forming polymer and the coating phase comprises the at least two reactive additives covalently bonded to each other.

43. The fine fiber of any of embodiments 1 through 42 wherein each fine fiber comprises a core phase, a coating phase, and a transition phase.

44. The fine fiber of embodiment 43 wherein the core phase predominantly comprises the fiber-forming polymer, the coating phase comprises the at least two reactive additives covalently bonded to each other, and the transition phase comprises the fiber-forming polymer and the at least two reactive additives covalently bonded to each other.

45. The fine fiber of embodiment 43 wherein the core phase predominantly comprises the fiber-forming polymer, the transition phase comprises the at least two reactive additives covalently bonded to each other, and the coating phase comprises a surface-migrating agent.

46. The fine fiber of embodiment 45 wherein the core phase predominantly comprises the fiber-forming polymer covalently bonded with at least one of the reactive additives, the transition phase comprises the at least two reactive additives covalently bonded to each other, and the coating phase comprises a surface-migrating agent.

47. The fine fiber of any of embodiments 1 through 46 wherein at least one reactive additive is a resinous aldehyde composition comprising reactive alkoxy groups and at least one reactive additive comprises alkoxy-reactive groups, wherein the molar ratio of alkoxy-reactive groups to the alkoxy groups is greater than 0.1:100.

Exemplary Fiber Embodiments

1. A fine fiber comprising:
    at least one fiber-forming polymer;
    at least two reactive additives that are covalently bonded to each other and optionally covalently bonded to the fiber-forming polymer;
    at least one of the reactive additives is self-condensed;
    wherein at least one of the reactive additives enhances at least one property of the fine fiber compared to the fine fiber without such reactive additive; and
    wherein at least one of the reactive additives is not a resinous aldehyde composition.
2. The fine fiber of embodiment 1 wherein at least one of the reactive additives is a surface-migrating agent.
3. The fine fiber of embodiment 2 wherein the surface-migrating agent is also a crosslinking agent.
4. The fine fiber of embodiment 3 wherein at least a portion of at least one fiber-forming polymer is crosslinked by the at least one surface-migrating crosslinking agent.
5. The fine fiber of embodiment 4 wherein the at least one surface-migrating crosslinking agent is a resinous aldehyde composition.
6. The fine fiber of any of embodiments 1 through 5 wherein at least one of the reactive additives is covalently bonded to at least one of the fiber-forming polymers.
7. A fine fiber comprising a core phase and a coating phase, wherein:
    the core phase comprises at least one fiber-forming polymer and the coating phase comprises at least one surface-migrating agent;
    the fiber includes at least a second additive that is covalently bonded to the surface-migrating agent and optionally is covalently bonded to the fiber-forming polymer, and enhances at least one property of the fine fiber compared to the fiber without such additive;
    at least a portion of the at least one fiber-forming polymer is crosslinked by at least one of the surface-migrating agent and the second additive; and
    at least one of the additives is not a resinous aldehyde composition.
8. The fine fiber of embodiment 7 wherein the at least one surface-migrating agent is a crosslinking agent and at least a portion of the at least one fiber-forming polymer is crosslinked by the at least one surface-migrating crosslinking agent.
9. The fine fiber of embodiment 8 wherein the surface-migrating crosslinking agent is a resinous aldehyde composition.
10. The fine fiber of any of embodiments 7 through 9 wherein at least one of the surface-migrating agent and the second additive is self condensed.
11. The fine fiber of any of embodiments 7 through 10 wherein the at least one surface-migrating agent is covalently bonded to the at least one fiber-forming polymer.
12. The fine fiber of any of embodiments 1 through 11 wherein the at least one property is a surface property of each fiber.
13. The fine fiber of any of embodiments 1 through 11 wherein the at least one property is a bulk property of each fiber.
14. The fine fiber of any of embodiments 1 through 13 wherein the at least one property is a mechanical and/or chemical property.
15. The fine fiber of any of embodiments 1 through 14 wherein the at least one property is selected from hydrophobicity, hydrophilicity, oleophobicity, oleophilicity, thermal stability, chemical stability, inter-fiber adhesion, adhesion for a substrate, antistatic, conductivity, stain resistance, water and/or oleo resistance, vibration damping, acoustic damping, and combinations thereof.
16. The fine fiber of any of embodiments 1 through 15 wherein at least one fiber-forming polymer comprises a polyamide.
17. The fine fiber of embodiment 16 wherein the polyamide comprises a nylon.
18. The fine fiber of embodiment 17 wherein the nylon comprises nylon-6, nylon-6,6, nylon-6,10, mixtures or copolymers thereof.
19. The fine fiber of embodiment 18 wherein the nylon comprises nylon-6-6,6-6,10.
20. The fine fiber of any of embodiments 1 through 19 wherein at least one fiber-forming polymer comprises a polyvinyl butyral, an ethylene co-vinyl alcohol co-polymer, or a mixture thereof.
21. The fine fiber of any of embodiments 1 through 20 wherein at least one fiber-forming polymer comprises a cellulose derivative selected from the group consisting of ethyl cellulose, hydroxyl ethyl cellulose, cellulose acetate, cellulose acetate butyrate, cellulose acetate propionate, cellulose acetate phthalate, and mixtures thereof.
22. The fine fiber of any of embodiments 1 through 21 wherein at least one fiber-forming polymer comprises a poly(meth)acrylic acid homopolymer or copolymer.
23. The fine fiber of embodiment 22 wherein at least one fiber-forming polymer comprises a styrene-(meth)acrylic acid copolymer.
24. The fine fiber of any of embodiments 1 through 23 wherein at least one fiber-forming polymer comprises a poly(maleic anhydride) copolymer.
25. The fine fiber of embodiment 24 wherein at least one fiber-forming polymer comprises a styrene-maleic anhydride copolymer.
26. The fine fiber of any of embodiments 1 through 25 wherein at least one of the reactive additives has a weight average molecular weight of less than 3000 Daltons.
27. The fine fiber of embodiment 26 wherein all of the reactive additives have a weight average molecular weight of less than 3000 Daltons.
28. The fine fiber of any of embodiments 1 through 27 wherein at least one of the reactive additives comprises a hydroxyl-functional component.

29. The fine fiber of embodiment 28 wherein the hydroxyl-functional component comprises a diol, a triol, a polyol, or a mixture thereof.
30. The fine fiber of embodiment 1 through 29 wherein at least one of the reactive additives comprises a carboxylic acid-functional component.
31. The fine fiber of embodiment 30 wherein the carboxylic acid-functional component comprises a compound with multiple carboxylic acid groups.
32. The fine fiber of any of embodiments 1 through 31 wherein at least one of the reactive additives comprises a glycidyl ether-functional component.
33. The fine fiber of embodiment 32 wherein the glycidyl ether-functional component comprises a compound with multiple glycidyl ether groups.
34. The fine fiber of any one of embodiments 1 through 33 wherein at least one of the reactive additives comprises an amine-functional component.
35. The fine fiber of embodiment 34 wherein the amine functional component comprises a primary amine compound, a secondary amine compound, a tertiary amine compound, or a mixture thereof.
36. The fine fiber of embodiment 35 wherein the amine-functional component comprises a compound with multiple primary, secondary, or tertiary amine groups.
37. The fine fiber of any of embodiments 1 through 36 wherein at least one reactive additive comprises an isocyanate-functional component.
38. The fine fiber of embodiment 37 wherein the isocyanate-functional component comprises a compound with multiple isocyanate groups.
39. The fine fiber of any of embodiments 1 through 38 wherein at least one reactive additive comprises dichlorodiphenyl sulfone.
40. The fine fiber of any of embodiments 1 through 39 wherein each fine fiber comprises a core phase, a coating phase, and a transition phase.
41. The fine fiber of embodiment 40 wherein the core phase predominantly comprises the fiber-forming polymer, the coating phase comprises the surface migrating agent and the second additive covalently bonded to each other, and the transition phase comprises the fiber-forming polymer and the surface migrating agent and the second additive covalently bonded to each other.
42. The fine fiber of embodiment 40 wherein the core phase predominantly comprises the fiber-forming polymer, the transition phase comprises the surface migrating agent and the second additive covalently bonded to each other, and the coating phase comprises the surface-migrating agent.
43. The fine fiber of embodiment 42 wherein the core phase predominantly comprises the fiber-forming polymer covalently bonded with at least one of the surface migrating agent and the second additive, the transition phase comprises the surface migrating agent and the second additive covalently bonded to each other, and the coating phase comprises the surface-migrating agent.
44. The fine fiber of any of embodiments 1 through 43 wherein at least one reactive additive is a resinous aldehyde composition comprising reactive alkoxy groups and at least one reactive additive comprises alkoxy-reactive groups, wherein the molar ratio of alkoxy-reactive groups to the alkoxy groups is greater than 0.1:100.
45. The fine fiber of any of embodiments 1 through 44 wherein at least one fiber-forming polymer is a nonreactive polymer.

Exemplary Filter Media and Filter Element Embodiments

1. A filter media comprising a filtration substrate and a layer comprising a plurality of fine fibers of any of the embodiments disclosed herein disposed on the substrate.
2. The filter media of embodiment 1 wherein the fine fiber layer has a thickness of 0.05 μm to 30 μm.
3. The filter media of embodiment 1 or embodiment 2 wherein the filtration substrate is a non-woven substrate.
4. The filter media of any of embodiments 1 through 3 wherein the fine fiber layer is an electrospun layer and the filtration substrate comprises a cellulosic, cellulose/synthetic blend, or synthetic nonwoven.
5. The filter media of any or embodiments 1 through 4 wherein the filtration substrate comprises a polyester nonwoven, a polyolefin nonwoven, or a blended nonwoven thereof.
6. The filter media of any of embodiments 1 through 5 wherein the filtration substrate comprises polypropylene nonwoven.
7. The filter media of any of embodiments 1 through 6 wherein the filtration substrate comprises a spunbonded or melt-blown support.
8. A filter element comprising a filter media of any one of embodiments 1 through 7.

EXAMPLES

Objects and advantages of this disclosure are further illustrated by the following examples, but the particular materials and amounts thereof recited in these examples, as well as other conditions and details, should not be construed to unduly limit this disclosure.

Table of Materials Used in Examples

| Name (as listed in literature/manufacturer) | Name as used in examples | Obtained from |
| --- | --- | --- |
| SVP 651 | Polyamide 651 651 | Shakeaspeare/Jarden Applied Materials |
| Poly(4-vinyl pyridine) | P4VP | Scientific Polymer |
| CYMEL 1133 | 1133 | Cytec |
| Bisphenol A | Bisphenol A (BPA) | Sigma Aldrich |
| Bisphenol AF | Bisphenol AF | Sigma Aldrich |
| Bisphenol A diglycidyl ether | Bisphenol A diglycidyl ether | Sigma Aldrich |
| Glutaric Acid | Glutaric acid (GA) | Sigma-Aldrich |
| Oxymer M112 | M112 | Perstop |
| PolyFox PF-7002 | PF-7002 | Omnova Solutions |
| Hostanox O3 Bis[3,3-bis-(4'-hydroxy-3'-tert-butylphenyl)butanoicacid]-glycol ester | Hostanox O3 | Clariant |

Test Procedures
Ethanol Soak Test

A sample of fine fibers in the form of a layer disposed on a substrate is submerged in ethanol (190 proof) under ambient conditions. After 1 minute, the sample is removed, dried, and evaluated for the amount of fine fiber layer efficiency retained as determined according to the procedure described in U.S. Pat. No. 6,743,273 ("Fine fiber layer efficiency retained"). Results are reported either simply as LEFS efficiency (As-is and post-ethanol soak) or as the fine fiber layer retained. The amount of fine fiber retained is reported as a percentage of the initial amount of fine fibers and referred to as "fine fiber layer efficiency retained." This gives a good indication of whether the degree of crosslinking achieved was sufficient to protect the bulk material from attack/dissolution to ethanol.

Thermogravimetric Analysis

Thermogravimetric analysis was conducted on the fine fiber samples that were electrospun and separated from the substrate media. A 7 to 9 mg sample was cut and placed in a tared platinum high temperature TGA pan. The sample was analyzed using a TA Instruments Q5000IR Thermogravimetric Analyzer (TGA). The sample was ramped in a nitrogen environment at 10° C. per minute from ambient to 800° C.

Thermal Stability and Off-Gas Resistance

Sample of fine fibers deposited on Hollingsworth and Vose (Grade FA 448) with an average basis weight of 68.6 pounds (lbs) per 3000 square feet ($ft^2$), average thickness of 0.011 inch (in), and average Frazier permeability of 16 feet per minute (ft/min) were tested for efficiency loss with temperature exposure either due to lack of thermal stability or destruction due to off-gassing from substrate media. Three samples randomly chosen were employed and exposed for 1 hr at each temperature (100° C. to 200° C.) increasing in intervals of 20° C. One set of samples (3) were used for the entire test. The data is reported in terms of ($\Delta(LEFS)=(LEFS)_T-(LEFS)_{ini}$)

Preparation Methods

Examples 1-5

Nylon copolymer resin (SVP 651 obtained from Shakespeare Co., Columbia, S.C., a terpolymer having a number average molecular weight of 21,500-24,800 comprising 45% nylon-6, 20% nylon-6,6 and 25% nylon-6,10) solutions were prepared by dissolving the polymer in alcohol (ethanol, 190 proof) and heating to 60° C. to produce a 9% solids solution. After cooling, to the solution was added a melamine-formaldehyde resin (i.e., crosslinking agent) (CYMEL 1133 obtained from Cytec Industries of West Paterson, N.J.) and. The weight ratio of melamine-formaldehyde resin to nylon was 40:100 parts by weight (Example 1 similar to Reference Example 4). Additionally, to the solution was added para-toluene sulfonic acid (7%, based on polymer solids). The solution was agitated until uniform and was then electrospun to form a layer of fine fiber on a filtration substrate. Four other solutions were prepared as in Example 1, but in addition to CYMEL 1133, reactive additive namely diols were added to the solutions such that a weight ratio of reactive additive(diol):1133=0.5:1. The diols employed are as follows; Example 2=Bisphenol A; Example 3=Bisphenol AF (both were obtained from Sigma Aldrich); Example 4=M112 (an aliphatic polycarbonate diol from Perstop) and finally for Example 5, a fluorosurfactant diol POLYFOX PF-7002 from Omnova Solutions was used. The solution was agitated until uniform and was then electrospun to form a layer of fine fiber on a filtration substrate. For this example a voltage of 50 kV was used to form the fine fiber layer on a substrate material moving at a line speed of 9 ft/min at a distance 4 inches from the emitter. The substrate material was a wetlaid cellulose media from Hollingsworth and Vose (Grade FA 448) with an average basis weight of 68.6 lbs/3000 $ft^2$, average thickness of 0.011 inch (in), and average Frazier permeability of 16 ft/min. All the samples were thermally treated at 140° C. for 10 minutes to facilitate crosslinking between SVP 651 and 1133 (additive 1) and reaction between 1133 and hydroxyl groups in the reactive additive (additive 2). The media layer with the fine fiber layer had initial LEFS efficiencies of 89.5, 84.4, 87.7, 88.6 and 91.3% c corresponding to Examples 1-5, respectively. SEM images in FIGS. 1(a) and (b) show similar fiber morphologies for Examples 1 and 5 respectively. In addition the three 4" circular samples for each were subjected to ethanol soak test described in the test procedure and LEFS measured after 24 hrs air drying. FIG. 2 shows LEFS results for pre- and post-ethanol soak samples.

Examples 6-10

Example 1 was repeated except weight ratio of CYMEL 1133:SVP 651=20:100 was used. For Examples 7-10, in addition to CYMEL 1133, diols were again added to the solutions but a weight ratio of reactive additive(diol):1133 was chosen to be =1:1. The diols employed are as follows; Example 7=Bisphenol A; Example 8=Bisphenol AF (Both were obtained from Sigma Aldrich); Example 9=M112 (an aliphatic polycarbonate diol from Perstop) and finally for Example 10, a fluorosurfactant diol POLYFOX PF-7002 from Omnova Solutions was used. As before, the solution was agitated and electrospun to form a layer of fine fiber on a filtration substrate. The media layer with the fine fiber layers had an initial LEFS efficiencies of 89.7, 81.9, 85.8, 88.2 and 88.2% corresponding to Examples 6-10 respectively. In addition the three 4" circular samples for each were subjected to ethanol soak test described in the test procedure and LEFS measured after 24 hrs air drying. FIG. 3 shows LEFS results for pre- and post-ethanol soak samples.

Examples 11 and 12

Examples 1 and 5 were repeated except in this case fine fiber layers were laid on uncorrugated cellulose media (cellulose substrate LEFS=19.5%) using pendant drop electrospinning for 5 minutes. A high voltage of 30 kV and 21 kV were employed for Examples 11 and 12 respectively. The needle to collector distance was adjusted to 4 inches. All the samples were thermally treated at 140° C. for 10 minutes to facilitate the crosslinking reaction between SVP 651 and 1133 (additive 1) and reaction between 1133 and hydroxyl groups in PF-7002 (additive 2). Flat sheets with fine fibers spun above were subjected to the ethanol soak test (1 min in ethanol) and then air dried. Water droplets were then placed on the flat sheets to observe droplet behavior (wicking, spreading, beading due to hydrophobicity, etc.) over a 15 min period. Following this initial observation, the samples were then soaked in ethanol for 90 min, dried and water droplet behavior was observed again. The droplet beading behavior (due to presence of PF7002) should decrease significantly if there is no reaction between the fluorinated reactive additive and 1133 and the reactive additive (PF7002) is washed away. The observations are tabulated in Table 1.

Examples 13 and 14

Examples 11 and 12 were repeated except the weight ratio of CYMEL 1133:SVP 651=20:100 and a weight ratio of reactive additive(diol):1133=1:1 was used. The observations are tabulated in Table 1.

Example 15

Example 12 was repeated except in this case a weight ratio of PF-7002:1133:=0.125:1 was employed. The observations are tabulated in Table 1.

Example 16

Example 14 was repeated except in this case a weight ratio of PF-7002:1133:=0.5:1 was employed. The observations are tabulated in Table 1.

Examples 17-19

Examples 6, 7, and 10, respectively, were repeated except the fine fibers were deposited on a stationary web of uncorrugated cellulose substrate for 5 minutes. Samples of fibers obtained using this method was submitted for thermogravimetric analysis to check thermal stability/fine fiber resistance to substrate off-gassing. FIG. 4 shows the TGA results.

Example 20

Example 1 was repeated and the samples of corrugated media (3 samples of 4-inch diameter) with fine fiber on it was subjected to the thermal stability/substrate off-gassing resistance test described in the test procedure. The results are plotted in FIG. 5.

Examples 21-23

Examples 20 was repeated but in the recipe in addition to 1133 (melamine formaldehyde resin), a reactive additive containing hydroxyl groups was added to the mixture such that the weight ratio of the reactive additive to 1133=0.5:1. Examples 21, 22 and 23 refer to Bisphenol A, Bisphenol F and Hostanox O3 (obtained from Clariant) respectively. The results are plotted in FIG. 5.

Example 24

Example 11 was repeated except a weight ratio of CYMEL 1133:SVP 651=60:100 was used. In addition, Bisphenol A diglycidyl ether (obtained from Sigma-Aldrich) was employed as the reactive additive the instead of using PF-7002 (diol). Specifically for this example, a weight ratio of reactive additive(diglycidyl ether):1133 was chosen to be =0.3:1. As in Example 1 the solution was agitated and electrospun (35 kV, 4-inch tip to collector distance) to form a layer of fine fiber on an uncorrugated cellulose substrate. Three samples were obtained by depositing fine fibers on the uncorrugated substrates for 1, 2 and 5 min respectively. The fiber morphology on the media with the fine fiber layers deposited for 1 min was analyzed by SEM. The sample was then subjected to ethanol soak test sample re-analyzed by SEM. FIG. 6 shows the SEM images for the pre and post ethanol soak sample. The media layer with the fine fiber layers deposited for 1 min had an initial LEFS efficiency of 95.6%. As before the sample was subjected to the ethanol soak test and the original fine fiber efficiency layer retained calculated. FIG. 9 shows the original; fine fiber efficiency layer retained results.

Example 25

Example 20 was repeated except a weight ratio of CYMEL 1133:SVP 651=40:100 was used. In addition a diacid, namely Poly(ethylene glycol) bis(carboxy methyl) ether (Mn=250; obtained from Sigma-Aldrich) was employed as the reactive additive. Specifically for this example, a weight ratio of reactive additive (diacid):1133 was chosen to be =0.44:1. As in Example 1 the solution was agitated and electrospun (26 kV, 4-inch tip to collector distance) to form a layer of fine fiber on an uncorrugated cellulose substrate. Three samples were obtained by depositing fine fibers on the uncorrugated substrates for 1, 2 and 5 min respectively. The fiber morphology on the media with the fine fiber layers deposited for 1 min was analyzed by SEM. The sample was then subjected to ethanol soak test sample re-analyzed by SEM. FIG. 7 shows the SEM images for the pre and post ethanol soak sample. The media layer with the fine fiber layers deposited for 1 min had an initial LEFS efficiency of 92.9%. As before the sample was subjected to the ethanol soak test and the original fine fiber efficiency layer retained calculated. FIG. 9 shows the original; fine fiber efficiency layer retained results.

Example 26

Example 25 was repeated except no reactive additive were added. A weight ratio of CYMEL 1133:SVP 651=40:100 was used. The media layer with the fine fiber layers deposited for 1 minute (min) had an initial LEFS efficiency of 94.9%. As before the sample was subjected to the ethanol soak test and the original fine fiber efficiency layer retained calculated. FIG. 9 shows the original; fine fiber efficiency layer retained results.

Example 27

Poly(4-vinyl pyridine) resin ("P4VP") solution was prepared by dissolving the polymer (8%) in 190 proof ethanol/water mixture (90:10 weight ratio). The homopolymer (P4VP) employed has a viscosity average molecular weight of about 200,000 (Scientific Polymer). To the solution was added melamine-formaldehyde crosslinking agent (RESIMENE HM2608 obtained from INEOS Melamines Inc., "ME"), an amount of about 80:100 parts by weight of resin:polymer content. Additionally to the solution was added para-toluene sulfonic acid (7 wt-%, based on polymer solids). A fluorinated diol described in Examples 5 and 10 (PF-7002) was employed as the reactive additive. Specifically for this example, a weight ratio of reactive additive (PF7002):2608 was chosen to be =0.5:1. As in Example 25, the solution was agitated and electrospun (25 kV, 4-inch tip to collector distance) to form a layer of fine fiber on an uncorrugated cellulose substrate. Three samples were obtained by depositing fine fibers on the uncorrugated substrates for 1, 2, and 5 min, respectively and post treated in the oven at 140° C. for 10 min. The fiber morphology on the media with the fine fiber layers deposited for 1 min was analyzed by SEM. The sample was then subjected to ethanol soak test sample re-analyzed by SEM. FIG. 8 shows the SEM images for the pre and post ethanol soak sample. The media layer with the fine fiber layers deposited for 1 min had an initial LEFS efficiency of 87.6%. As before the sample was subjected to the ethanol soak test and the original fine fiber efficiency layer retained calculated. FIG. 9 shows the original; fine fiber efficiency layer retained results.

Example 28

Example 12 was repeated except a weight ratio of (PF-7002):1133=0.12:1 was used. The contact angle (measured using FTA 100) of the fine fiber on the uncorrugated substrate was measured. Table 2 shows the result.

Example 29

Example 28 was repeated except that citric acid was chose as the reactive additive. The weight of citric acid:1133=0.1:1 was chosen. The contact angle of the fine fiber on the uncorrugated substrate was measured. Table 2 shows the result.

Examples 30-32

Example 27 was repeated except the reactive additives chosen for this example were Bisphenol A (BPA) and Glutaric acid (GA). The weight ratio of BPA:P4VP is chose as 0.2:1 (Example 30), 0.4:1 (Example 31), and 0.6:1 (Example 32) respectively. For each of the examples, the amount of the other reactive additive (Glutaric acid or GA) is chosen such that the mole ratio of BPA:GA=1:1. Samples were obtained by depositing fine fibers on the uncorrugated substrates for 1 minute for each of the examples and post treated in the oven at 140° C. for 10 minutes. The fiber morphology on the media with the fine fiber layers was analyzed by SEM. A representative image corresponding to Example 31 is shown FIG. 10. Fiber output and quality appears to be unaffected by the additive reactions.

Example 33

Example 30 was repeated except the polymer used was SVP 651 and a 9% solids (polymer) concentration was used. In Example 33 a weight ratio of BPA:651=0.2:1 was used. For the example, the amount of the other reactive additive (Glutaric acid or GA) is chosen such that the mole ratio of BPA:GA is 1:1. In addition a higher operating voltage (31 kV, 4-inch tip to collector distance) was employed. Samples were obtained by depositing fine fibers on the uncorrugated substrates for 1 minute and post treated in the oven at 140° C. for 10 minutes. The fiber morphology on the media with the fine fiber layers was analyzed by SEM. Fiber output and quality appeared to be unaffected by the additive reactions.

Example 34

Example 34 was repeated without the use of any resinous aldehyde. The reactive additives chosen for this example were Bisphenol A diglycidyl ether and PF-7002. Weight ratios of Bisphenol A diglycidyl ether:P4VP=1:1 and PF-7002: Bisphenol A diglycidyl ether=0.5:1 were employed. Additionally to the solution was added para-toluene sulfonic acid (7 wt-%, based on polymer solids). As in Example 27, the solution was agitated and electrospun (25 kV, 4-inch tip to collector distance) to form a layer of fine fiber on an uncorrugated cellulose substrate. Samples were obtained by depositing fine fibers on the uncorrugated substrates for 1 minute and post treated in the oven at 140° C. for 10 min. The fiber morphology on the media with the fine fiber layers deposited for 1 min was analyzed by SEM. The sample was then subjected to ethanol soak test sample re-analyzed by SEM. FIG. 10 shows the SEM images for the pre and post ethanol soak sample. The media layer with the fine fiber layers deposited for 1 min had an initial LEFS efficiency of 80%. As before the sample was subjected to the ethanol soak test and the original fine fiber efficiency layer retained calculated. FIG. 9 shows the % original fine fiber efficiency layer retained results.

Results
Results: Bulk Properties of the Fine Fibers

The fine fiber samples produced in Examples 1-28 had an average fiber diameter of no greater than 10 microns (μm). Typically, they possessed average fiber diameters ranging from 200 nanometers (nm) to 400 nm, as measured by Scanning Electron Microscopy (SEM). Certain of the samples were evaluated for fiber morphology, particle capture efficiency (LEFS—particle capture efficiency at 0.8 μm latex particles, bench operating at 20 ft/min per ASTM Standard F1215-89), ethanol soak resistance, and thermal or substrate off-gassing resistance.

Fiber Morphology

A key feature of the fine fibers of the present disclosure is the absence of any adverse effect of the reactive additive composition on the fiber formation properties of the polymer used. FIG. 1 compares the SEM images of the fibers of Example 1 (1133:polyamide 651=0.4:1) and a fiber of Example 5 (1133:polyamide 651=0.4:1 and PF-7002: 1133=0.5:1). Both fiber layers were formed on the same substrate material. Clearly both fiber formation and the resulting fiber diameters are very similar. The absence of an adverse effect of the reactive additive composition (fluorinated diol, namely PF-7002 in this example) on the fiber forming ability of the polymer (nylon in this example) suggests that particle capture efficiency would be largely unaffected as well. FIGS. 2 and 3 confirm our assertion that fine fiber forming ability is unhampered by the addition of the reactive additive composition.

Effect of Reactive Additives on the Wetting Behavior

This technology allows to judiciously control the fine fiber behavior on exposure to water by altering the fine fiber. In Examples 13-16, PF7002 a fluorinated diol is chosen as the additive. A drop of water is gently laid on the surface of the fine fiber deposited on the uncorrugated cellulose substrate and the behavior monitored for both pre and post-soak samples. Table 1 describes the droplet behavior. From this it can be seen that: (i) the fine fiber surface is now more hydrophobic due to the pendant fluoro groups in PF-7002; and (ii) the reactive additive (PF-7002 in this case) has reacted with 1133 since alcohol soak does not wash away the reactive additive.

TABLE 1

Water droplet behavior on various samples

| Sample | Water droplet behavior pre-soak | Water droplet behavior on sample post ethanol soak |
| --- | --- | --- |
| Example 1 | Does not wick; starts wicking very very slowly after 1 min; after 15 min no more wicking droplet is flat | Wicks very slowly after about 30 sec; after 15 min still wicking |
| Example 6 | Wick slowly; starts wicking fast after 1 min; after 15 min water wicked and dried on surface | Wicks slowly after about 1 min; after 15 min completely wicked and dried on surface |
| Example 15 | Does not wick; droplet stays on sheet | Does not wick; droplet stays on sheet |
| Example 5 | Does not wick; droplet stays on sheet | Does not wick; droplet stays on sheet |
| Example 16 | Does not wick; droplet stays on sheet | Does not wick; droplet stays on sheet |
| Example 10 | Does not wick; droplet stays on sheet | Does not wick; droplet stays on sheet |

In Example 29, citric acid is chosen as the additive. We expect that due to steric reasons not all the functional groups in citric acid (COOH and OH) will react with the alkoxy groups in 1133. Presence of unreacted COOH and OH groups should in theory lower the contact angle.

TABLE 2

Contact angle on various samples

| Sample | Contact Angle |
|---|---|
| Example 11 | 88 |
| Example 28 | 110.7 |
| Example 29 | 79.7 |

Clearly the fine fiber surface chemistry can be altered depending on the type of reactive additive employed.

Effect of Reactive Additives on the TGA of Fine Fibers

Again as with water resistance, this technology allows to manipulate the fine fiber temperature behavior by carefully altering the fine fiber. FIG. 4 plots and compares the TGA graphs for a control sample (Example 6, no reactive additive), Example 7 and Example 10. The graphs in the Figure demonstrate that, the fine fiber temperature resistance as measured by TGA can be increased (Bisphenol A) or decreased (fluorinated polyether diol) depending on the choice of the reactive additive.

Effect of Reactive Additives on the Temperature Behavior of Fine Fibers on Cellulose Substrate Samples of corrugated media (3 samples of 4" diameter) with fine fiber on it were subjected to thermal stability/substrate off-gassing resistance test as described in the test procedure. Based on the initial TGA results, three hydroxyl containing reactive additives were chosen to investigate the effect of temperature on the particulate efficiency of the composite fine fiber/cellulose substrate. Two of the additives are Bisphenol A and Bisphenol AF. The third is a phenolic antioxidant Hostanox O3 obtained from Clariant. FIG. 5 compares the drop in efficiency reported in terms of ($\Delta$(LEFS)=(LEFS)$_T$–(LEFS)$_{ini}$). The fine fiber temperature behavior improves dramatically due to protection provided by the reaction between the 1133 and the appropriately chosen reactive additive.

Reactive Additives with Other Functional Groups

Most of the discussion so far has dealt with reactive additives with primarily hydroxyl groups (except for citric acid). This technology is valid for reactive additives having functional groups that can react with the alkoxy group in the melamine formaldehyde (or other crosslinkers such as urea based or benzoguanamine based etc.). Examples 24 and 25 represent two such functional groups, namely glycidyl ether in Example 24 and carboxylic acid in Example 25. FIG. 6 shows the SEM images of pre and post ethanol soak fiber morphology for Example 24 (1133:polyamide 651=0.6:1 and Bisphenol A diglycidyl ether:1133=0.3:1). FIG. 7 shows the SEM images of pre and post ethanol soak fiber morphology for Example 25 (1133:polyamide 651=0.46:1 and poly(ethylene glycol) bis(carboxy methyl) ether:1133=0.44:1). FIG. 8 shows the SEM images of pre and post ethanol soak fiber morphology for Example 26 (2608:poly(4-vinyl pyridine)=0.8:1 and PF-7002:2608=0.5:1). FIG. 10 shows the SEM images of fine fiber morphology for Example 31 (BPA:poly(4-vinyl pyridine)=0.8:1 and Glutaric Acid:BPA (molar)=1:1). FIG. 11 shows the SEM images of pre and post ethanol soak fiber morphology for Example 34 (Bisphenol A diglycidyl ether:poly(4-vinyl pyridine)=1:1 and PF-7002:Bisphenol A diglycidyl ether=0.5:1). In all cases fiber layers were formed on the same substrate material (uncorrugated cellulose substrate. Clearly both fiber formation and the resulting fiber diameters are very similar to FIG. 1. The absence of an adverse effect of other functional groups besides diols (FIGS. 6, 7, 10, and 11) and reactive alkoxy groups (FIGS. 10 and 11) as one of the reactive additives on the fiber forming ability of the polymer suggests that particle capture efficiency would be largely unaffected as well. FIG. 9 plots the % original fiber layer retained after ethanol soak for the Examples 24-27 and Example 34.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The invention claimed is:

1. A method of making fine fibers, the method comprising:
providing at least one fiber-forming polymer;
providing at least two reactive additives reactive with each other, and optionally reactive with the fiber-forming polymer, wherein the at least two reactive additives are not themselves fiber-forming;
combining the at least one fiber-forming polymer and the at least two reactive additives under conditions effective to form a plurality of fine fibers, wherein the fine fibers have an average diameter of less than 5 microns; and
post-treating the fine fibers under conditions effective to form covalent bonds between the at least two reactive additives and optionally to react at least one of the reactive additives with at least one fiber-forming polymer;
with the proviso that:
at least one of the reactive additives is not a resinous aldehyde composition;
at least one of the reactive additives is an alkoxy-functional reactive additive, a hydroxyl-functional reactive additive, an acid-functional reactive additive, a glycidyl ether-functional reactive additive, an isocyanate-functional reactive additive, an amine-functional reactive additive, and/or a dichloro-functional reactive additive; and
if at least one of the fiber-forming polymers is a polyamide, then none of the reactive additives is a polyamide.

2. A method of making fine fibers, the method comprising:
providing at least one fiber-forming polymer;
providing at least two reactive additives reactive with each other, and optionally reactive with the fiber-forming polymer, wherein the at least two reactive additives are not themselves fiber-forming;
combining the at least one fiber-forming polymer and the at least two reactive additives under conditions effective to form a plurality of fine fibers, wherein the fine fibers have an average diameter of less than 5 microns; and
post-treating the fine fibers under conditions effective to form covalent bonds between the at least two reactive additives and optionally to react at least one of the reactive additives with at least one fiber-forming polymer;
with the proviso that:
at least one of the reactive additives is not a resinous aldehyde composition; and
at least one of the reactive additives has a weight average molecular weight of less than 3000 Daltons.

3. The method of claim 2 further comprising forming covalent bonds between the at least two reactive additives and optionally reacting at least one of the reactive additives with at least one fiber-forming polymer during the combining step.

4. The method of claim 2 wherein post-treating the fine fibers comprises subjecting the fine fibers to conditions effective to form covalent bonds between at least one of the reactive additives and at least one fiber-forming polymer.

5. A fine fiber prepared by a method comprising:
providing at least one fiber-forming polymer;
providing at least two reactive additives reactive with each other, wherein at least one of the reactive additives is reactive with the at least one fiber-forming polymer, and wherein the at least two reactive additives are not themselves fiber-forming;
combining the at least one fiber-forming polymer and the at least two reactive additives to form a plurality of fine fibers, wherein the fine fibers have an average diameter of less than 5 microns, wherein the fine fibers comprise a core phase and a coating phase, and wherein the core phase comprises the at least one fiber-forming polymer and the coating phase comprises the at least two reactive additives; and
post-treating the fine fibers under conditions effective to form covalent bonds between the at least two reactive additives and to react at least one of the reactive additives with the at least one fiber-forming polymer;
with the proviso that:
at least one of the reactive additives is not a resinous aldehyde composition; and
if the fiber-forming polymer is a polyamide, then none of the reactive additives is a polyamide.

6. A fine fiber prepared by a method comprising:
providing at least one fiber-forming polymer;
providing at least two reactive additives reactive with each other, wherein at least one of the reactive additives is reactive with the at least one fiber-forming polymer, and wherein the at least two reactive additives are not themselves fiber-forming;
combining the at least one fiber-forming polymer and the at least two reactive additives to form a plurality of fine fibers, wherein the fine fibers have an average diameter of less than 5 microns, wherein the fine fibers comprise a core phase and a coating phase, and wherein the core phase comprises the fiber-forming polymer and the coating phase comprises the at least two reactive additives; and
post-treating the fine fibers under conditions effective to form covalent bonds between the at least two reactive additives and to react at least one of the reactive additives with the at least one fiber-forming polymer;
with the proviso that:
at least one of the reactive additives is not a resinous aldehyde composition; and
at least one of the reactive additives has a weight average molecular weight of less than 3000 Daltons.

7. A fine fiber prepared by a method comprising:
providing at least one fiber-forming polymer;
providing at least two reactive additives reactive with each other, and not reactive with the at least one fiber-forming polymer, wherein the at least two reactive additives are not themselves fiber-forming;
combining the at least one fiber-forming polymer and the at least two reactive additives to form a plurality of fine fibers, wherein the fine fibers have an average diameter of less than 5 microns, wherein the fine fibers comprise a core phase and a coating phase, and wherein the core phase comprises a fiber-forming polymer and the coating phase comprises the at least two reactive additives; and
post-treating the fine fibers under conditions effective to form covalent bonds between the at least two reactive additives;
with the proviso that:
at least one of the reactive additives is not a resinous aldehyde composition;
at least one of the reactive additives is tri-functional or higher; and
if at least one of the fiber-forming polymers is a polyamide, then none of the reactive additives is a polyamide.

8. A fine fiber prepared by a method comprising:
providing at least one fiber-forming polymer;
providing at least two reactive additives reactive with each other, and not reactive with the at least one fiber-forming polymer, wherein the at least two reactive additives are not themselves fiber-forming;
combining the at least one fiber-forming polymer and the at least two reactive additives to form a plurality of fine fibers, wherein the fine fibers have an average diameter of less than 5 microns, and wherein the fine fibers comprise a core phase and a coating phase, wherein the core phase comprises a fiber-forming polymer and the coating phase comprises the at least two reactive additives; and
post-treating the fine fibers under conditions effective to form covalent bonds between the at least two reactive additives;
with the proviso that:
at least one of the reactive additives is not a resinous aldehyde composition;
at least one of the reactive additives is tri-functional or higher; and
at least one of the reactive additives has a weight average molecular weight of less than 3000 Daltons.

9. The fine fiber of claim 8 wherein at least one of the reactive additives is a surface-migrating agent.

10. The fine fiber of claim 9 wherein the surface-migrating agent is also a crosslinking agent.

11. The fine fiber of claim 10 wherein at least a portion of at least one fiber-forming polymer is crosslinked by the surface-migrating crosslinking agent.

12. The fine fiber of claim 11 wherein the at least one surface-migrating crosslinking agent is a resinous aldehyde composition.

13. A fine fiber comprising:
a core phase comprising at least one fiber-forming polymer;
a coating phase comprising at least two reactive additives that are covalently bonded to each other and that are not themselves fiber-forming;
wherein the at least two reactive additives are optionally covalently bonded to the fiber-forming polymer;
wherein at least one of the reactive additives is self-condensed;
wherein at least one of the reactive additives enhances at least one property of the fine fiber compared to the fine fiber without such reactive additive;
wherein at least one of the reactive additives is not a resinous aldehyde composition; and
wherein the fine fiber has an average diameter of less than 5 microns.

14. The fine fiber of claim 13 wherein at least one of the reactive additives is covalently bonded to at least one of the fiber-forming polymers.

15. A fine fiber comprising a core phase and a coating phase, wherein:

the core phase comprises at least one fiber-forming polymer and the coating phase comprises at least one surface-migrating agent, wherein the surface-migrating agent is capable of migrating to the surface of the fine fiber;

the fine fiber includes at least a second additive that is covalently bonded to the surface-migrating agent and optionally is covalently bonded to the fiber-forming polymer, and enhances at least one property of the fine fiber compared to the fiber without such additive;

the fine fiber has an average diameter of less than 5 microns;

at least a portion of the at least one fiber-forming polymer is crosslinked by at least one of the surface-migrating agent and the second additive; and at least one of the additives is not a resinous aldehyde composition.

16. The fine fiber of claim 15 wherein the at least one property is a surface property of each fiber or a bulk property of each fiber.

17. The fine fiber of claim 15 wherein the at least one surface-migrating agent is a resinous aldehyde composition.

18. The fine fiber of claim 15 wherein the at least one property is selected from hydrophobicity, hydrophilicity, oleophobicity, oleophilicity, thermal stability, chemical stability, inter-fiber adhesion, adhesion to a substrate, antistatic, conductivity, stain resistance, water and/or oleo resistance, vibration damping, acoustic damping, and combinations thereof.

19. A filter media comprising a filtration substrate and a layer comprising a plurality of fine fibers of claim 15 disposed on the substrate.

20. A filter element comprising a filter media of claim 19.

21. The fine fiber of claim 13 wherein at least one of the reactive additives is an alkoxy-functional reactive additive, a hydroxyl-functional reactive additive, an acid-functional reactive additive, a glycidyl ether-functional reactive additive, an isocyanate-functional reactive additive, an amine-functional reactive additive, and/or a dichloro-functional reactive additive.

* * * * *